(12) United States Patent
Evans et al.

(10) Patent No.: US 9,224,145 B1
(45) Date of Patent: Dec. 29, 2015

(54) VENUE BASED DIGITAL RIGHTS USING CAPTURE DEVICE WITH DIGITAL WATERMARKING CAPABILITY

(75) Inventors: Gregory Morgan Evans, Raleigh, NC (US); James Evans, Apex, NC (US); Thomas Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1394 days.

(21) Appl. No.: 11/512,575

(22) Filed: Aug. 30, 2006

(51) Int. Cl.
*G06F 21/00* (2006.01)
*H04N 7/12* (2006.01)
*G06K 9/00* (2006.01)
*G06Q 20/40* (2012.01)

(52) U.S. Cl.
CPC .................. *G06Q 20/4014* (2013.01)

(58) Field of Classification Search
CPC .................................................. G06Q 2220/18
USPC ............................................. 705/51, 57, 59
See application file for complete search history.

(56) References Cited

U.S. PATENT DOCUMENTS

| | | |
|---|---|---|
| 610,861 A | 9/1898 | Goodwin |
| 725,034 A | 4/1903 | Brownell |
| 2,289,555 A | 7/1942 | Simons |
| 2,298,382 A | 10/1942 | Hutchison, Jr. et al. |
| 3,062,102 A | 11/1962 | Martin |
| RE25,635 E | 9/1964 | Nerwin et al. |
| 3,675,549 A | 7/1972 | Adair |
| 3,814,227 A | 6/1974 | Stern |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,057,830 A | 11/1977 | Adcock |
| 4,081,752 A | 3/1978 | Sumi |
| 4,125,111 A | 11/1978 | Hudspeth et al. |
| 4,131,919 A | 12/1978 | Lloyd et al. |

(Continued)

FOREIGN PATENT DOCUMENTS

| | | |
|---|---|---|
| AD | 8-223524 A | 8/1996 |
| DE | 3518887 C1 | 9/1986 |

(Continued)

OTHER PUBLICATIONS

"Kodak DC220/260 Camera Twain Acquire Module," Eastman Kodak Company, 1998, 4 pages.

(Continued)

*Primary Examiner* — Charles C Agwumezie
(74) *Attorney, Agent, or Firm* — Withrow & Terranova, PLLC

(57) ABSTRACT

A system for tracking copyright compliance comprises a database, the database including unique identifiers for a plurality of content capture devices. The unique identifiers may be obtained from devices prior to the presentation of protectable content, for example, by pre-registration during the process of obtaining a ticket to a performance or at a security checkpoint at an event. The unique identifiers may be associated with a copyright policy pertaining to content at the event. Each device may embed its unique identifier in content captured by the device, such as via a watermark. Software may obtain data embedded in content and access the database to determine the copyright status of the content by sending a request including data identifying the capture device. If content is obtained from an unauthorized source, the content may be traced back to a specific device.

8 Claims, 6 Drawing Sheets

System Overview for Venue Copyright.

(56) References Cited

U.S. PATENT DOCUMENTS

| | | |
|---|---|---|
| 4,158,208 A | 6/1979 | Dischert |
| 4,168,488 A | 9/1979 | Evans |
| 4,172,327 A | 10/1979 | Kuehn et al. |
| 4,183,645 A | 1/1980 | Ohmura |
| 4,195,317 A | 3/1980 | Stratton |
| 4,234,890 A | 11/1980 | Astle |
| 4,253,756 A | 3/1981 | Kurei |
| 4,267,555 A | 5/1981 | Boyd et al. |
| 4,306,793 A | 12/1981 | Date et al. |
| 4,325,080 A | 4/1982 | Satoh |
| 4,329,029 A | 5/1982 | Haskell |
| 4,337,479 A | 6/1982 | Tomimoto et al. |
| 4,347,618 A | 8/1982 | Kavouras et al. |
| 4,359,222 A | 11/1982 | Smith, III et al. |
| 4,364,650 A | 12/1982 | Terashita et al. |
| 4,403,303 A | 9/1983 | Howes et al. |
| 4,416,282 A | 11/1983 | Saulson |
| 4,423,934 A | 1/1984 | Lambeth et al. |
| 4,456,931 A | 6/1984 | Toyoda et al. |
| 4,466,230 A | 8/1984 | Osselaere |
| 4,470,067 A | 9/1984 | Mino |
| 4,471,382 A | 9/1984 | Toyoda et al. |
| 4,477,164 A | 10/1984 | Nakai et al. |
| 4,519,692 A | 5/1985 | Michalik |
| 4,531,161 A | 7/1985 | Murakoshi |
| 4,540,276 A | 9/1985 | Ost |
| 4,542,377 A | 9/1985 | Hagen et al. |
| 4,554,638 A | 11/1985 | Iida |
| 4,570,158 A | 2/1986 | Bleich et al. |
| 4,574,319 A | 3/1986 | Konishi |
| 4,601,055 A | 7/1986 | Kent |
| 4,603,966 A | 8/1986 | Brownstein |
| 4,623,930 A | 11/1986 | Oshima et al. |
| 4,641,198 A | 2/1987 | Ohta et al. |
| 4,674,107 A | 6/1987 | Urban et al. |
| 4,691,253 A | 9/1987 | Silver |
| 4,698,685 A | 10/1987 | Beaverson |
| 4,723,169 A | 2/1988 | Kaji |
| 4,736,224 A | 4/1988 | Watanabe |
| 4,739,409 A | 4/1988 | Baumeister |
| 4,772,941 A | 9/1988 | Noble |
| 4,774,600 A | 9/1988 | Baumeister |
| 4,791,477 A | 12/1988 | Blazek et al. |
| 4,794,465 A | 12/1988 | Van Luyt et al. |
| 4,797,836 A | 1/1989 | Witek et al. |
| 4,801,793 A | 1/1989 | Vaynshteyn |
| 4,806,920 A | 2/1989 | Sawada |
| 4,816,855 A | 3/1989 | Kitaura et al. |
| 4,823,283 A | 4/1989 | Diehm |
| 4,825,324 A | 4/1989 | Miyake et al. |
| 4,827,347 A | 5/1989 | Bell |
| 4,851,897 A | 7/1989 | Inuma |
| 4,853,733 A | 8/1989 | Watanabe et al. |
| 4,855,831 A | 8/1989 | Miyamoto |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi |
| 4,916,435 A | 4/1990 | Fuller |
| 4,931,960 A | 6/1990 | Morikawa |
| 4,935,809 A | 6/1990 | Hayashi et al. |
| 4,937,676 A | 6/1990 | Finelli et al. |
| 4,937,685 A | 6/1990 | Barker et al. |
| 4,942,417 A | 7/1990 | Miyazawa |
| 4,952,920 A | 8/1990 | Hayashi |
| 4,965,675 A | 10/1990 | Hori |
| 4,969,647 A | 11/1990 | Mical et al. |
| 4,972,495 A | 11/1990 | Blike et al. |
| 4,974,151 A | 11/1990 | Advani et al. |
| 4,982,291 A | 1/1991 | Kurahashi |
| 4,992,887 A | 2/1991 | Aragaki |
| 4,996,714 A | 2/1991 | Desjardins et al. |
| 5,001,697 A | 3/1991 | Torres |
| 5,007,027 A | 4/1991 | Shimoi |
| 5,014,193 A | 5/1991 | Garner et al. |
| 5,016,107 A | 5/1991 | Sasson |
| 5,018,017 A | 5/1991 | Sasaki et al. |
| 5,020,012 A | 5/1991 | Stockberger |
| 5,021,989 A | 6/1991 | Fujisawa et al. |
| 5,027,150 A | 6/1991 | Inoue |
| 5,027,227 A | 6/1991 | Kita |
| 5,030,944 A | 7/1991 | Masimo et al. |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,038,320 A | 8/1991 | Heath et al. |
| 5,040,068 A | 8/1991 | Parulski |
| 5,040,070 A | 8/1991 | Higashitsutsumi |
| 5,043,801 A | 8/1991 | Watanabe |
| 5,043,816 A | 8/1991 | Nakano |
| 5,049,916 A | 9/1991 | O'Such et al. |
| 5,050,098 A | 9/1991 | Brown et al. |
| 5,057,924 A | 10/1991 | Yamada |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash |
| 5,101,364 A | 3/1992 | Davenport |
| 5,106,107 A | 4/1992 | Justus |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,133,076 A | 7/1992 | Hawkins et al. |
| 5,134,390 A | 7/1992 | Kishimoto et al. |
| 5,134,431 A | 7/1992 | Ishimura et al. |
| 5,134,434 A | 7/1992 | Inoue et al. |
| 5,138,459 A | 8/1992 | Roberts |
| 5,138,460 A | 8/1992 | Egawa |
| 5,140,358 A | 8/1992 | Tokunaga |
| 5,142,319 A | 8/1992 | Wakabayashi |
| 5,142,680 A | 8/1992 | Ottman et al. |
| 5,144,358 A | 9/1992 | Tsuru et al. |
| 5,144,445 A | 9/1992 | Higashitsutsumi |
| 5,146,259 A | 9/1992 | Kobayashi et al. |
| 5,146,353 A | 9/1992 | Isoguchi et al. |
| 5,153,729 A | 10/1992 | Saito |
| 5,153,730 A | 10/1992 | Nagasaki |
| 5,159,364 A | 10/1992 | Yanagisawa et al. |
| 5,161,012 A | 11/1992 | Choi |
| 5,161,025 A | 11/1992 | Nakao |
| 5,161,026 A | 11/1992 | Mabuchi et al. |
| 5,161,535 A | 11/1992 | Short |
| 5,164,751 A | 11/1992 | Weyer |
| 5,164,831 A | 11/1992 | Kuchta |
| 5,172,103 A | 12/1992 | Kita |
| 5,179,653 A | 1/1993 | Fuller |
| 5,184,169 A | 2/1993 | Nishitani |
| 5,185,667 A | 2/1993 | Zimmermann |
| 5,187,517 A | 2/1993 | Miyasaka |
| 5,187,776 A | 2/1993 | Yanker |
| 5,189,404 A | 2/1993 | Masimo et al. |
| 5,189,408 A | 2/1993 | Teicher |
| 5,189,466 A | 2/1993 | Yasukawa |
| 5,189,490 A | 2/1993 | Shetty |
| 5,193,538 A | 3/1993 | Ekwall |
| 5,194,944 A | 3/1993 | Uchiyama |
| 5,198,851 A | 3/1993 | Ogawa |
| 5,199,101 A | 3/1993 | Cusick et al. |
| 5,200,818 A | 4/1993 | Neta et al. |
| 5,202,767 A | 4/1993 | Dozier |
| 5,202,844 A | 4/1993 | Kamio et al. |
| 5,204,916 A | 4/1993 | Hamilton et al. |
| 5,218,459 A | 6/1993 | Parulski et al. |

(56) References Cited

U.S. PATENT DOCUMENTS

| | | |
|---|---|---|
| 5,218,647 A | 6/1993 | Blonstein |
| 5,220,420 A | 6/1993 | Hoarty et al. |
| 5,220,614 A | 6/1993 | Crain |
| 5,223,935 A | 6/1993 | Tsuji |
| 5,224,207 A | 6/1993 | Filion et al. |
| 5,227,835 A | 7/1993 | Anagnostopoulos |
| 5,227,863 A | 7/1993 | Bilbrey et al. |
| 5,227,889 A | 7/1993 | Yoneyama et al. |
| 5,229,856 A | 7/1993 | Koshiishi |
| 5,231,511 A | 7/1993 | Kodama et al. |
| 5,231,651 A | 7/1993 | Ozaki |
| 5,237,648 A | 8/1993 | Mills |
| 5,237,650 A | 8/1993 | Priem et al. |
| 5,239,419 A | 8/1993 | Kim |
| 5,241,334 A | 8/1993 | Kobayashi et al. |
| 5,241,659 A | 8/1993 | Parulski et al. |
| 5,247,321 A | 9/1993 | Kazami |
| 5,247,327 A | 9/1993 | Suzuka |
| 5,247,682 A | 9/1993 | Kondou et al. |
| 5,247,683 A | 9/1993 | Holmes et al. |
| 5,253,071 A | 10/1993 | MacKay |
| 5,258,795 A | 11/1993 | Lucas |
| 5,260,795 A | 11/1993 | Sakai |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,265,238 A | 11/1993 | Canova et al. |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,278,604 A | 1/1994 | Nakamura |
| 5,282,187 A | 1/1994 | Lee |
| 5,283,560 A | 2/1994 | Bartlett |
| 5,283,792 A | 2/1994 | Davies |
| 5,287,192 A | 2/1994 | Iizuka |
| 5,297,051 A | 3/1994 | Arakawa et al. |
| 5,298,936 A | 3/1994 | Akitake et al. |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,329,289 A | 7/1994 | Sakamoto et al. |
| 5,331,366 A | 7/1994 | Tokunaga |
| 5,335,072 A | 8/1994 | Tanaka et al. |
| 5,339,432 A | 8/1994 | Crick |
| 5,341,466 A | 8/1994 | Perlin |
| 5,343,246 A | 8/1994 | Arai et al. |
| 5,343,267 A | 8/1994 | Kazumi |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack |
| 5,367,318 A | 11/1994 | Beaudin et al. |
| 5,367,332 A | 11/1994 | Kerns et al. |
| 5,373,153 A | 12/1994 | Cumberledge |
| 5,375,160 A | 12/1994 | Guidon et al. |
| 5,386,111 A | 1/1995 | Zimmerman |
| 5,386,177 A | 1/1995 | Uhm |
| 5,386,552 A | 1/1995 | Garney |
| 5,390,026 A | 2/1995 | Lim |
| 5,390,314 A | 2/1995 | Swanson |
| 5,392,462 A | 2/1995 | Komaki |
| 5,396,343 A | 3/1995 | Hanselman |
| 5,402,170 A | 3/1995 | Parulski et al. |
| 5,402,171 A | 3/1995 | Tagami et al. |
| 5,404,316 A | 4/1995 | Klingler et al. |
| 5,404,505 A | 4/1995 | Levinson |
| 5,408,265 A | 4/1995 | Sasaki |
| 5,414,811 A | 5/1995 | Parulski et al. |
| 5,416,556 A | 5/1995 | Suzuki et al. |
| 5,420,635 A | 5/1995 | Konishi et al. |
| 5,425,137 A | 6/1995 | Mohan et al. |
| 5,428,733 A | 6/1995 | Carr |
| 5,432,720 A | 7/1995 | Lucente et al. |
| 5,432,871 A | 7/1995 | Novik |
| 5,432,900 A | 7/1995 | Rhodes et al. |
| 5,434,618 A | 7/1995 | Hayashi et al. |
| 5,434,958 A | 7/1995 | Surma et al. |
| 5,434,964 A | 7/1995 | Moss |
| 5,434,969 A | 7/1995 | Heilveil et al. |
| 5,436,657 A | 7/1995 | Fukuoka |
| 5,436,659 A | 7/1995 | Vincent |
| 5,440,401 A | 8/1995 | Parulski et al. |
| 5,442,465 A | 8/1995 | Compton |
| 5,444,482 A | 8/1995 | Misawa et al. |
| 5,448,372 A | 9/1995 | Axman et al. |
| 5,452,145 A | 9/1995 | Wakui et al. |
| 5,459,830 A | 10/1995 | Ohba et al. |
| 5,461,429 A | 10/1995 | Konishi et al. |
| 5,463,728 A | 10/1995 | Blahut |
| 5,463,729 A | 10/1995 | Kitaguchi |
| 5,465,133 A | 11/1995 | Aoki et al. |
| 5,467,152 A | 11/1995 | Wilson |
| 5,467,288 A | 11/1995 | Fasciano et al. |
| 5,473,370 A | 12/1995 | Moronaga et al. |
| 5,473,371 A | 12/1995 | Choi |
| 5,473,740 A | 12/1995 | Kasson |
| 5,475,428 A | 12/1995 | Hintz et al. |
| 5,475,441 A | 12/1995 | Parulski et al. |
| 5,475,812 A | 12/1995 | Corona et al. |
| 5,477,264 A | 12/1995 | Sarbadhikari et al. |
| 5,479,206 A | 12/1995 | Ueno et al. |
| 5,481,330 A | 1/1996 | Yamasaki |
| 5,481,667 A | 1/1996 | Bieniek et al. |
| 5,485,200 A | 1/1996 | Shimizu |
| 5,486,853 A | 1/1996 | Baxter |
| 5,488,414 A | 1/1996 | Hirasawa |
| 5,489,945 A | 2/1996 | Kannegundla |
| 5,489,955 A | 2/1996 | Satoh |
| 5,493,332 A | 2/1996 | Dalton et al. |
| 5,493,335 A | 2/1996 | Parulski et al. |
| 5,495,342 A | 2/1996 | Harigaya |
| 5,495,559 A | 2/1996 | Makino |
| 5,496,106 A | 3/1996 | Anderson |
| 5,497,193 A | 3/1996 | Mitsuhashi |
| 5,497,490 A | 3/1996 | Harada et al. |
| 5,499,294 A | 3/1996 | Friedman |
| 5,500,936 A | 3/1996 | Allen et al. |
| 5,502,486 A | 3/1996 | Ueda |
| 5,504,550 A | 4/1996 | Takagi et al. |
| 5,506,617 A | 4/1996 | Parulski et al. |
| 5,510,830 A | 4/1996 | Ohia et al. |
| 5,512,941 A | 4/1996 | Takahashi |
| 5,513,306 A | 4/1996 | Mills |
| 5,513,342 A | 4/1996 | Leong et al. |
| 5,515,101 A | 5/1996 | Yoshida |
| 5,517,606 A | 5/1996 | Matheny et al. |
| 5,519,815 A | 5/1996 | Klassen |
| 5,521,639 A | 5/1996 | Tomura |
| 5,521,663 A | 5/1996 | Norris |
| 5,521,717 A | 5/1996 | Maeda |
| 5,521,841 A | 5/1996 | Arman et al. |
| 5,523,786 A | 6/1996 | Parulski |
| 5,523,857 A | 6/1996 | Fukushima |
| 5,525,957 A | 6/1996 | Tanaka |
| 5,526,812 A | 6/1996 | Dumoulin et al. |
| 5,528,293 A | 6/1996 | Watanabe |
| 5,528,315 A | 6/1996 | Sugiyama |
| 5,530,235 A | 6/1996 | Stefik et al. |
| 5,530,517 A | 6/1996 | Patton et al. |
| 5,532,740 A | 7/1996 | Wakui |
| 5,534,975 A | 7/1996 | Stefik et al. |
| 5,537,151 A | 7/1996 | Orr |
| 5,537,530 A | 7/1996 | Edgar |
| 5,539,528 A | 7/1996 | Tawa |
| 5,539,535 A | 7/1996 | Aizawa et al. |
| 5,539,658 A | 7/1996 | Mccullough |
| 5,541,656 A | 7/1996 | Kare et al. |
| 5,543,925 A | 8/1996 | Timmermans |
| 5,548,371 A | 8/1996 | Kawahara |

(56) References Cited

U.S. PATENT DOCUMENTS

| | | |
|---|---|---|
| 5,548,409 A | 8/1996 | Ohta et al. |
| 5,550,646 A | 8/1996 | Hassan et al. |
| 5,550,938 A | 8/1996 | Hayakawa et al. |
| 5,552,806 A | 9/1996 | Lenchik |
| 5,553,277 A | 9/1996 | Hirano et al. |
| 5,555,193 A | 9/1996 | Tsinberg et al. |
| 5,557,329 A | 9/1996 | Lim |
| 5,559,554 A | 9/1996 | Uekane et al. |
| 5,559,946 A | 9/1996 | Porter |
| 5,560,022 A | 9/1996 | Dunstan et al. |
| 5,561,493 A | 10/1996 | Takahashi |
| 5,563,655 A | 10/1996 | Lathrop |
| 5,565,957 A | 10/1996 | Goto |
| 5,566,098 A | 10/1996 | Lucente et al. |
| 5,568,167 A | 10/1996 | Galbi |
| 5,568,192 A | 10/1996 | Hannah |
| 5,572,233 A | 11/1996 | Kakegawa |
| 5,574,933 A | 11/1996 | Horst |
| 5,576,757 A | 11/1996 | Roberts et al. |
| 5,576,759 A | 11/1996 | Kawamura et al. |
| 5,577,190 A | 11/1996 | Peters |
| 5,577,220 A | 11/1996 | Combs et al. |
| 5,578,757 A | 11/1996 | Roth |
| 5,579,029 A | 11/1996 | Arai et al. |
| 5,579,048 A | 11/1996 | Hirasawa |
| 5,579,450 A | 11/1996 | Hanyu |
| 5,581,311 A | 12/1996 | Kuroiwa |
| 5,583,791 A | 12/1996 | Harigaya et al. |
| 5,585,845 A | 12/1996 | Kawamura |
| 5,587,740 A | 12/1996 | Brennan |
| 5,589,902 A | 12/1996 | Gruel et al. |
| 5,590,306 A | 12/1996 | Watanabe et al. |
| 5,592,301 A | 1/1997 | Shimada |
| 5,594,524 A | 1/1997 | Sasagaki |
| 5,597,193 A | 1/1997 | Conner |
| 5,598,181 A | 1/1997 | Kermisch |
| 5,600,371 A | 2/1997 | Arai et al. |
| 5,602,566 A | 2/1997 | Motosyuku et al. |
| 5,603,053 A | 2/1997 | Gough et al. |
| 5,606,365 A | 2/1997 | Maurinus |
| 5,608,490 A | 3/1997 | Ogawa |
| 5,608,491 A | 3/1997 | Sasagaki |
| 5,610,653 A | 3/1997 | Abecassis |
| 5,610,654 A | 3/1997 | Parulski |
| 5,613,004 A | 3/1997 | Cooperman et al. |
| 5,614,946 A | 3/1997 | Fukuoka |
| 5,614,981 A | 3/1997 | Bryant |
| 5,619,738 A | 4/1997 | Petruchik |
| 5,621,459 A | 4/1997 | Ueda |
| 5,621,906 A | 4/1997 | O'Neill |
| 5,625,412 A | 4/1997 | Aciu et al. |
| 5,627,623 A | 5/1997 | Sasagaki et al. |
| 5,630,017 A | 5/1997 | Gasper et al. |
| 5,630,185 A | 5/1997 | Kawamura |
| 5,631,701 A | 5/1997 | Miyake |
| 5,631,871 A | 5/1997 | Park et al. |
| 5,633,573 A | 5/1997 | Van Phuoc et al. |
| 5,633,678 A | 5/1997 | Parulski et al. |
| 5,633,976 A | 5/1997 | Ogino |
| 5,634,000 A | 5/1997 | Wicht |
| 5,634,144 A | 5/1997 | Mauro |
| 5,634,154 A | 5/1997 | Sasagaki |
| 5,635,983 A | 6/1997 | Ohmori |
| 5,635,984 A | 6/1997 | Lee |
| 5,637,871 A | 6/1997 | Piety et al. |
| 5,638,123 A | 6/1997 | Yamaguchi |
| 5,638,498 A | 6/1997 | Tyler et al. |
| 5,638,501 A | 6/1997 | Gough et al. |
| 5,640,193 A | 6/1997 | Wellner |
| 5,640,202 A | 6/1997 | Kondo |
| 5,640,204 A | 6/1997 | Tsutsui |
| 5,640,627 A | 6/1997 | Nakano |
| 5,640,635 A | 6/1997 | Fullam |
| 5,644,653 A | 7/1997 | Sunakawa et al. |
| 5,644,694 A | 7/1997 | Appleton |
| 5,648,816 A | 7/1997 | Wakui |
| 5,649,032 A | 7/1997 | Burt et al. |
| 5,649,186 A | 7/1997 | Ferguson |
| 5,649,245 A | 7/1997 | Inoue |
| 5,651,107 A | 7/1997 | Frank et al. |
| 5,656,804 A | 8/1997 | Barkan et al. |
| 5,656,957 A | 8/1997 | Marlow |
| 5,659,547 A | 8/1997 | Scarr et al. |
| 5,659,729 A | 8/1997 | Nielsen |
| 5,659,805 A | 8/1997 | Furlani et al. |
| 5,661,519 A | 8/1997 | Franetzki |
| 5,661,632 A | 8/1997 | Register |
| 5,664,087 A | 9/1997 | Tani et al. |
| 5,666,580 A | 9/1997 | Ito et al. |
| 5,668,639 A | 9/1997 | Martin |
| 5,671,378 A | 9/1997 | Acker et al. |
| 5,671,440 A | 9/1997 | Curry |
| 5,672,840 A | 9/1997 | Sage et al. |
| 5,673,304 A | 9/1997 | Connor et al. |
| 5,674,003 A | 10/1997 | Andersen |
| 5,675,139 A | 10/1997 | Fama |
| 5,675,358 A | 10/1997 | Bullock et al. |
| 5,675,752 A | 10/1997 | Scott et al. |
| 5,680,533 A | 10/1997 | Yamato |
| 5,680,534 A | 10/1997 | Yamato et al. |
| 5,682,197 A | 10/1997 | Moghadam et al. |
| 5,682,207 A | 10/1997 | Takeda et al. |
| 5,682,326 A | 10/1997 | Klingler et al. |
| 5,682,441 A | 10/1997 | Ligtenberg et al. |
| 5,684,511 A | 11/1997 | Westerink et al. |
| 5,684,542 A | 11/1997 | Tsukagoshi |
| 5,687,236 A | 11/1997 | Moskowitz et al. |
| 5,687,376 A | 11/1997 | Celi, Jr. et al. |
| 5,687,408 A | 11/1997 | Park |
| 5,697,004 A | 12/1997 | Saegusa |
| 5,699,109 A | 12/1997 | Nishimura et al. |
| 5,701,433 A | 12/1997 | Moriarty et al. |
| 5,701,900 A | 12/1997 | Shehada |
| 5,703,644 A | 12/1997 | Mori et al. |
| 5,704,029 A | 12/1997 | Wright, Jr. |
| 5,706,049 A | 1/1998 | Moghadam et al. |
| 5,706,097 A | 1/1998 | Schelling et al. |
| 5,706,457 A | 1/1998 | Dwyer et al. |
| 5,708,561 A | 1/1998 | Huilgol et al. |
| 5,708,810 A | 1/1998 | Kern et al. |
| 5,710,572 A | 1/1998 | Nihei |
| 5,711,330 A | 1/1998 | Nelson |
| 5,714,973 A | 2/1998 | Takahashi et al. |
| 5,715,524 A | 2/1998 | Jambhekar et al. |
| 5,719,799 A | 2/1998 | Isashi |
| 5,719,967 A | 2/1998 | Sekine |
| 5,719,978 A | 2/1998 | Kakii et al. |
| 5,719,987 A | 2/1998 | Kawamura et al. |
| 5,721,908 A | 2/1998 | Lagarde |
| 5,721,909 A | 2/1998 | Oulid-Aissa et al. |
| 5,724,070 A | 3/1998 | Denninghoff et al. |
| 5,724,475 A | 3/1998 | Kirsten |
| 5,724,579 A | 3/1998 | Suzuki |
| 5,727,112 A | 3/1998 | Kellar et al. |
| 5,727,159 A | 3/1998 | Kikinis |
| 5,729,289 A | 3/1998 | Etoh |
| 5,734,425 A | 3/1998 | Takizawa et al. |
| 5,734,427 A | 3/1998 | Hayashi |
| 5,734,436 A | 3/1998 | Abe |
| 5,734,875 A | 3/1998 | Cheng |
| 5,734,915 A | 3/1998 | Roewer |
| 5,737,032 A | 4/1998 | Stenzel |
| 5,737,476 A | 4/1998 | Kim |
| 5,737,491 A | 4/1998 | Allen et al. |
| 5,740,267 A | 4/1998 | Echerer |
| 5,740,436 A | 4/1998 | Davis et al. |
| 5,740,801 A | 4/1998 | Branson |
| 5,742,331 A | 4/1998 | Uomori et al. |
| 5,742,339 A | 4/1998 | Wakui |
| 5,742,435 A | 4/1998 | Nagashima et al. |
| 5,742,436 A | 4/1998 | Furter |
| 5,742,475 A | 4/1998 | Riddiford |
| 5,742,504 A | 4/1998 | Meyer et al. |
| 5,742,659 A | 4/1998 | Atac |

(56) References Cited

U.S. PATENT DOCUMENTS

| | | |
|---|---|---|
| 5,742,698 A | 4/1998 | Minami et al. |
| 5,745,097 A | 4/1998 | Cappels |
| 5,745,175 A | 4/1998 | Anderson |
| 5,745,808 A | 4/1998 | Tintera |
| 5,748,326 A | 5/1998 | Thompson-Bell et al. |
| 5,748,831 A | 5/1998 | Kubo |
| 5,751,350 A | 5/1998 | Tanaka |
| 5,752,089 A | 5/1998 | Miyazawa et al. |
| 5,752,244 A | 5/1998 | Rose |
| 5,754,227 A | 5/1998 | Fukuoka |
| 5,754,873 A | 5/1998 | Nolan |
| 5,757,354 A | 5/1998 | Kawamura |
| 5,757,418 A | 5/1998 | Inagaki |
| 5,757,427 A | 5/1998 | Miyaguchi |
| 5,757,468 A | 5/1998 | Patton et al. |
| 5,758,180 A | 5/1998 | Duffy et al. |
| 5,760,767 A | 6/1998 | Shore et al. |
| 5,761,655 A | 6/1998 | Hoffman |
| 5,761,686 A | 6/1998 | Bloomberg |
| 5,764,276 A | 6/1998 | Martin et al. |
| 5,764,278 A | 6/1998 | Nagao |
| 5,764,291 A | 6/1998 | Fullam |
| 5,767,897 A | 6/1998 | Howell |
| 5,767,904 A | 6/1998 | Miyake |
| 5,769,713 A | 6/1998 | Katayama |
| 5,771,034 A | 6/1998 | Gibson |
| 5,773,810 A | 6/1998 | Hussey |
| 5,774,131 A | 6/1998 | Kim |
| 5,774,233 A | 6/1998 | Sakamoto |
| 5,777,876 A | 7/1998 | Beauchesne |
| 5,781,175 A | 7/1998 | Hara |
| 5,781,650 A | 7/1998 | Lobo |
| 5,781,798 A | 7/1998 | Beatty et al. |
| 5,784,177 A | 7/1998 | Sanchez et al. |
| 5,784,525 A | 7/1998 | Bell |
| 5,784,629 A | 7/1998 | Anderson |
| 5,786,851 A | 7/1998 | Kondo |
| D396,853 S | 8/1998 | Cooper et al. |
| 5,790,094 A | 8/1998 | Tanigawa et al. |
| 5,790,193 A | 8/1998 | Ohmori |
| 5,790,418 A | 8/1998 | Roberts |
| 5,790,800 A | 8/1998 | Gauvin et al. |
| 5,790,878 A | 8/1998 | Anderson et al. |
| 5,796,428 A | 8/1998 | Matsumoto et al. |
| 5,796,875 A | 8/1998 | Read |
| 5,797,051 A | 8/1998 | Mcintyre |
| 5,798,750 A | 8/1998 | Ozaki |
| 5,801,685 A | 9/1998 | Miller et al. |
| 5,801,770 A | 9/1998 | Paff et al. |
| 5,801,773 A | 9/1998 | Ikeda |
| 5,803,565 A | 9/1998 | McIntyre et al. |
| 5,805,153 A | 9/1998 | Nielsen |
| 5,805,163 A | 9/1998 | Bagnas |
| 5,805,829 A | 9/1998 | Cohen et al. |
| 5,806,005 A | 9/1998 | Hull |
| 5,806,072 A | 9/1998 | Kuba et al. |
| 5,809,345 A | 9/1998 | Numako |
| 5,812,736 A | 9/1998 | Anderson |
| 5,815,160 A | 9/1998 | Kikuchi |
| 5,815,201 A | 9/1998 | Hashimoto et al. |
| 5,815,205 A | 9/1998 | Hashimoto et al. |
| 5,818,925 A | 10/1998 | Anders et al. |
| 5,818,977 A | 10/1998 | Tansley |
| 5,819,103 A | 10/1998 | Endoh et al. |
| 5,819,107 A | 10/1998 | Lichtman et al. |
| 5,821,997 A | 10/1998 | Kawamura et al. |
| 5,822,492 A | 10/1998 | Wakui et al. |
| 5,822,581 A | 10/1998 | Christeson |
| 5,825,675 A | 10/1998 | Want et al. |
| 5,828,406 A | 10/1998 | Parulski |
| 5,828,793 A | 10/1998 | Mann |
| 5,831,590 A | 11/1998 | Ikedo |
| 5,831,872 A | 11/1998 | Pan |
| 5,835,761 A | 11/1998 | Ishii et al. |
| 5,835,772 A | 11/1998 | Thurlo |
| 5,838,325 A | 11/1998 | Deen et al. |
| 5,841,422 A | 11/1998 | Shyu |
| 5,841,471 A | 11/1998 | Endsley et al. |
| 5,845,166 A | 12/1998 | Fellegara et al. |
| 5,847,698 A | 12/1998 | Reavey |
| 5,847,706 A | 12/1998 | Kingsley |
| 5,848,193 A | 12/1998 | Garcia |
| 5,848,420 A | 12/1998 | Xu |
| 5,850,483 A | 12/1998 | Takabatake et al. |
| 5,852,502 A | 12/1998 | Beckett |
| 5,854,641 A | 12/1998 | Howard et al. |
| 5,861,918 A | 1/1999 | Anderson |
| 5,862,217 A | 1/1999 | Steinberg et al. |
| 5,862,218 A | 1/1999 | Steinberg |
| 5,862,297 A | 1/1999 | Timmermans |
| 5,867,214 A | 2/1999 | Anderson et al. |
| 5,867,686 A | 2/1999 | Conner et al. |
| 5,870,143 A | 2/1999 | Suzuki |
| 5,870,464 A | 2/1999 | Brewster et al. |
| 5,870,549 A | 2/1999 | Bobo, II |
| 5,870,756 A | 2/1999 | Nakata |
| 5,873,007 A | 2/1999 | Ferrada suarez |
| 5,874,959 A | 2/1999 | Rowe |
| 5,874,967 A | 2/1999 | West et al. |
| 5,876,351 A | 3/1999 | Rohde |
| 5,877,214 A | 3/1999 | Kim |
| 5,877,746 A | 3/1999 | Parks et al. |
| 5,881,205 A | 3/1999 | Andrew |
| 5,883,610 A | 3/1999 | Jeon |
| 5,890,014 A | 3/1999 | Long |
| 5,892,511 A | 4/1999 | Gelsinger et al. |
| 5,892,847 A | 4/1999 | Johnson |
| 5,896,131 A | 4/1999 | Alexander |
| 5,896,166 A | 4/1999 | D'Alfonso et al. |
| 5,896,203 A | 4/1999 | Shibata |
| 5,898,434 A | 4/1999 | Small et al. |
| 5,898,779 A | 4/1999 | Squilla et al. |
| 5,898,833 A | 4/1999 | Kidder |
| 5,899,851 A | 5/1999 | Koninckx |
| 5,900,909 A | 5/1999 | Parulski et al. |
| 5,901,303 A | 5/1999 | Chew |
| 5,903,309 A | 5/1999 | Anderson |
| 5,903,700 A | 5/1999 | Fukushima |
| 5,903,786 A | 5/1999 | Goto |
| 5,907,315 A | 5/1999 | Vlahos et al. |
| 5,910,805 A | 6/1999 | Hickey |
| 5,917,488 A | 6/1999 | Anderson et al. |
| 5,920,688 A | 7/1999 | Cooper et al. |
| 5,920,726 A | 7/1999 | Anderson |
| 5,926,208 A | 7/1999 | Noonen et al. |
| 5,929,904 A | 7/1999 | Uchida |
| 5,933,137 A | 8/1999 | Anderson |
| 5,935,259 A | 8/1999 | Anderson |
| 5,936,619 A | 8/1999 | Nagasaki et al. |
| 5,937,106 A | 8/1999 | Murayama |
| 5,937,213 A | 8/1999 | Wakabayashi et al. |
| 5,938,764 A | 8/1999 | Klein |
| 5,938,766 A | 8/1999 | Anderson et al. |
| 5,940,080 A | 8/1999 | Ruehle |
| 5,940,121 A | 8/1999 | Mcintyre |
| 5,943,050 A | 8/1999 | Bullock et al. |
| 5,943,093 A | 8/1999 | Anderson et al. |
| 5,943,332 A | 8/1999 | Liu et al. |
| 5,948,091 A | 9/1999 | Kerigan et al. |
| 5,949,408 A | 9/1999 | Kang et al. |
| 5,949,432 A | 9/1999 | Gough et al. |
| 5,949,474 A | 9/1999 | Gerszberg et al. |
| 5,949,496 A | 9/1999 | Kim |
| 5,949,950 A | 9/1999 | Kubo |
| 5,956,049 A | 9/1999 | Cheng |
| 5,956,084 A | 9/1999 | Moronaga et al. |
| 5,963,255 A | 10/1999 | Anderson et al. |
| 5,963,670 A | 10/1999 | Lipson et al. |
| 5,966,116 A | 10/1999 | Wakeland |
| 5,966,122 A | 10/1999 | Itoh |
| 5,969,718 A | 10/1999 | Mills |
| 5,969,761 A | 10/1999 | Takahashi et al. |
| 5,973,664 A | 10/1999 | Badger |
| 5,973,691 A | 10/1999 | Servan-schreiber |

(56) References Cited

U.S. PATENT DOCUMENTS

| | | |
|---|---|---|
| 5,973,694 A | 10/1999 | Steele et al. |
| 5,973,734 A | 10/1999 | Anderson |
| 5,974,386 A | 10/1999 | Ejima et al. |
| 5,977,975 A | 11/1999 | Mugura et al. |
| 5,977,976 A | 11/1999 | Maeda |
| 5,977,985 A | 11/1999 | Ishii et al. |
| 5,978,016 A | 11/1999 | Lourette et al. |
| 5,978,020 A | 11/1999 | Watanabe et al. |
| 5,978,607 A | 11/1999 | Teremy |
| 5,982,350 A | 11/1999 | Hekmatpour et al. |
| 5,982,429 A | 11/1999 | Kamamoto et al. |
| 5,983,073 A | 11/1999 | Ditzik |
| 5,983,297 A | 11/1999 | Noble et al. |
| 5,986,634 A | 11/1999 | Alioshin et al. |
| 5,986,701 A | 11/1999 | Anderson |
| 5,987,223 A | 11/1999 | Narukawa et al. |
| 5,991,465 A | 11/1999 | Anderson |
| 5,991,515 A | 11/1999 | Fall et al. |
| 5,993,137 A | 11/1999 | Harr |
| 5,999,173 A | 12/1999 | Ubillos |
| 5,999,191 A | 12/1999 | Frank et al. |
| 5,999,207 A | 12/1999 | Rodriguez et al. |
| 5,999,213 A | 12/1999 | Tsushima et al. |
| 5,999,740 A | 12/1999 | Rowley |
| 5,999,989 A | 12/1999 | Patel |
| 6,003,093 A | 12/1999 | Kester |
| 6,005,613 A | 12/1999 | Endsley et al. |
| 6,005,618 A | 12/1999 | Fukui |
| 6,006,039 A | 12/1999 | Steinberg et al. |
| 6,009,336 A | 12/1999 | Harris et al. |
| 6,011,585 A | 1/2000 | Anderson |
| 6,011,926 A | 1/2000 | Cockell |
| 6,012,088 A | 1/2000 | Li et al. |
| 6,015,093 A | 1/2000 | Barrett |
| 6,020,920 A | 2/2000 | Anderson |
| 6,020,982 A | 2/2000 | Yamauchi et al. |
| 6,022,315 A | 2/2000 | Iliff |
| 6,023,241 A | 2/2000 | Clapper |
| 6,023,697 A | 2/2000 | Bates et al. |
| 6,025,827 A | 2/2000 | Bullock et al. |
| 6,028,603 A | 2/2000 | Wang et al. |
| 6,028,611 A | 2/2000 | Anderson et al. |
| 6,031,964 A | 2/2000 | Anderson |
| 6,035,323 A | 3/2000 | Narayen et al. |
| 6,035,359 A | 3/2000 | Enoki |
| 6,037,972 A | 3/2000 | Horiuchi et al. |
| 6,038,545 A | 3/2000 | Mandeberg et al. |
| 6,052,555 A | 4/2000 | Ferguson |
| 6,052,692 A | 4/2000 | Anderson et al. |
| 6,058,268 A | 5/2000 | Maeno |
| 6,058,428 A | 5/2000 | Wang et al. |
| 6,072,479 A | 6/2000 | Ogawa |
| 6,072,480 A | 6/2000 | Gorbet et al. |
| 6,072,489 A | 6/2000 | Gough et al. |
| 6,075,905 A | 6/2000 | Herman et al. |
| 6,078,005 A | 6/2000 | Kurakake |
| 6,078,756 A | 6/2000 | Squilla et al. |
| 6,082,827 A | 7/2000 | Mcfall |
| 6,084,990 A | 7/2000 | Suzuki et al. |
| 6,091,377 A | 7/2000 | Kawai |
| 6,091,846 A | 7/2000 | Lin et al. |
| 6,091,956 A | 7/2000 | Hollenberg |
| 6,094,221 A | 7/2000 | Andersion |
| 6,097,389 A | 8/2000 | Morris et al. |
| 6,097,423 A | 8/2000 | Mattsson-Boze et al. |
| 6,097,430 A | 8/2000 | Komiya et al. |
| 6,097,431 A | 8/2000 | Anderson et al. |
| 6,097,855 A | 8/2000 | Levien |
| 6,104,430 A | 8/2000 | Fukuoka |
| 6,111,604 A | 8/2000 | Hashimoto et al. |
| 6,115,025 A | 9/2000 | Buxton et al. |
| 6,118,480 A | 9/2000 | Anderson et al. |
| 6,122,003 A | 9/2000 | Anderson |
| 6,122,005 A | 9/2000 | Sasaki |
| 6,122,409 A | 9/2000 | Boggs et al. |
| 6,128,013 A | 10/2000 | Prabhu |
| 6,128,413 A | 10/2000 | Benamara |
| 6,131,125 A | 10/2000 | Rostoker et al. |
| 6,134,606 A | 10/2000 | Anderson et al. |
| 6,137,468 A | 10/2000 | Martinez et al. |
| 6,137,534 A | 10/2000 | Anderson |
| 6,141,044 A | 10/2000 | Anderson et al. |
| 6,141,052 A | 10/2000 | Fukumitsu et al. |
| 6,144,362 A | 11/2000 | Kawai |
| 6,147,703 A | 11/2000 | Miller |
| 6,147,709 A | 11/2000 | Martin et al. |
| 6,148,149 A | 11/2000 | Kagle |
| 6,151,450 A | 11/2000 | Numako |
| 6,154,210 A | 11/2000 | Anderson |
| 6,154,576 A | 11/2000 | Anderson et al. |
| 6,157,394 A | 12/2000 | Anderson |
| 6,161,131 A | 12/2000 | Garfinkle |
| 6,163,722 A | 12/2000 | Magin |
| 6,163,816 A | 12/2000 | Anderson et al. |
| 6,167,469 A | 12/2000 | Safai |
| 6,169,575 B1 | 1/2001 | Anderson |
| 6,169,725 B1 | 1/2001 | Gibbs et al. |
| 6,175,663 B1 | 1/2001 | Huang |
| 6,177,956 B1 | 1/2001 | Anderson et al. |
| 6,177,957 B1 | 1/2001 | Anderson |
| 6,177,958 B1 | 1/2001 | Anderson |
| 6,188,431 B1 | 2/2001 | Oie |
| 6,188,432 B1 | 2/2001 | Ejima |
| 6,188,782 B1 | 2/2001 | Le beux |
| 6,204,877 B1 | 3/2001 | Kiyokawa |
| 6,205,485 B1 | 3/2001 | Kikinis |
| 6,208,429 B1 | 3/2001 | Anderson |
| 6,209,048 B1 | 3/2001 | Wolff |
| 6,211,870 B1 | 4/2001 | Foster |
| 6,212,632 B1 | 4/2001 | Surine |
| 6,215,523 B1 | 4/2001 | Anderson |
| 6,222,538 B1 | 4/2001 | Anderson |
| 6,222,584 B1 | 4/2001 | Pan |
| 6,223,190 B1 | 4/2001 | Aihara et al. |
| 6,226,449 B1 | 5/2001 | Inoue et al. |
| 6,229,566 B1 | 5/2001 | Matsumoto et al. |
| 6,230,307 B1 | 5/2001 | Davis et al. |
| 6,232,932 B1 | 5/2001 | Thorner |
| 6,233,015 B1 | 5/2001 | Miller |
| 6,233,016 B1 | 5/2001 | Anderson |
| 6,237,010 B1 | 5/2001 | Hui |
| 6,239,794 B1 | 5/2001 | Yuen et al. |
| 6,239,837 B1 | 5/2001 | Yamada et al. |
| 6,246,430 B1 | 6/2001 | Peters |
| 6,249,316 B1 | 6/2001 | Anderson |
| 6,256,063 B1 | 7/2001 | Saito et al. |
| 6,260,102 B1 | 7/2001 | Robinson |
| 6,262,769 B1 | 7/2001 | Anderson et al. |
| 6,263,421 B1 | 7/2001 | Anderson |
| 6,263,453 B1 | 7/2001 | Anderson |
| 6,275,260 B1 | 8/2001 | Anderson |
| 6,275,622 B1 | 8/2001 | Krtolica |
| 6,278,447 B1 | 8/2001 | Anderson |
| 6,285,398 B1 | 9/2001 | Shinsky et al. |
| 6,292,215 B1 | 9/2001 | Vincent |
| 6,292,218 B1 | 9/2001 | Parulski et al. |
| RE37,431 E | 10/2001 | Lanier et al. |
| 6,298,197 B1 | 10/2001 | Wain et al. |
| 6,300,950 B1 | 10/2001 | Clark et al. |
| 6,304,851 B1 | 10/2001 | Kmack et al. |
| 6,307,544 B1 | 10/2001 | Harding |
| 6,310,647 B1 | 10/2001 | Parulski et al. |
| 6,310,648 B1 | 10/2001 | Miller et al. |
| 6,317,141 B1 | 11/2001 | Pavley |
| 6,334,025 B1 | 12/2001 | Yamagami |
| 6,353,848 B1 | 3/2002 | Morris |
| 6,356,281 B1 | 3/2002 | Isenman |
| 6,356,357 B1 | 3/2002 | Anderson |
| 6,362,850 B1 | 3/2002 | Alsing |
| 6,370,282 B1 | 4/2002 | Pavley et al. |
| 6,377,302 B1 | 4/2002 | Ozaki |
| 6,380,972 B1 | 4/2002 | Suga et al. |
| 6,400,375 B1 | 6/2002 | Okudaira |
| 6,400,471 B1 | 6/2002 | Kuo et al. |

(56) References Cited

U.S. PATENT DOCUMENTS

| | | |
|---|---|---|
| 6,426,771 B1 | 7/2002 | Kosugi |
| 6,429,896 B1 | 8/2002 | Aruga |
| 6,437,829 B1 | 8/2002 | Webb |
| 6,441,828 B1 | 8/2002 | Oba et al. |
| 6,441,854 B2 | 8/2002 | Fellegara et al. |
| 6,441,927 B1 | 8/2002 | Dow et al. |
| 6,445,412 B1 | 9/2002 | Shiohara |
| 6,473,123 B1 | 10/2002 | Anderson |
| 6,483,602 B1 | 11/2002 | Haneda |
| 6,486,914 B1 | 11/2002 | Anderson |
| 6,493,028 B1 | 12/2002 | Anderson |
| 6,504,575 B1 | 1/2003 | Ramirez et al. |
| 6,507,362 B1 | 1/2003 | Akerib |
| 6,507,363 B1 | 1/2003 | Anderson |
| 6,512,548 B1 | 1/2003 | Anderson |
| 6,515,704 B1 | 2/2003 | Sato |
| 6,532,039 B2 | 3/2003 | Anderson |
| 6,536,357 B1 | 3/2003 | Hiestand |
| 6,538,698 B1 | 3/2003 | Anderson |
| 6,546,430 B2 | 4/2003 | Gray, III et al. |
| 6,563,535 B1 | 5/2003 | Anderson |
| 6,563,542 B1 | 5/2003 | Hatakenaka et al. |
| 6,563,961 B1 | 5/2003 | Murayama |
| 6,567,101 B1 | 5/2003 | Thomas |
| 6,567,122 B1 | 5/2003 | Anderson et al. |
| 6,571,271 B1 | 5/2003 | Savitzky et al. |
| 6,577,336 B2 | 6/2003 | Safai |
| 6,587,119 B1 | 7/2003 | Anderson et al. |
| 6,597,384 B1 | 7/2003 | Harrison |
| 6,597,817 B1 | 7/2003 | Silverbrook |
| 6,608,650 B1 | 8/2003 | Torres |
| 6,624,824 B1 | 9/2003 | Tognazzini et al. |
| 6,642,956 B1 | 11/2003 | Safai |
| 6,654,050 B2 | 11/2003 | Karube et al. |
| 6,657,667 B1 | 12/2003 | Anderson |
| 6,680,749 B1 | 1/2004 | Anderson et al. |
| 6,682,207 B2 | 1/2004 | Weber et al. |
| 6,683,649 B1 | 1/2004 | Anderson |
| 6,700,612 B1 | 3/2004 | Anderson |
| 6,738,075 B1 | 5/2004 | Torres |
| 6,738,091 B1 | 5/2004 | Eouzan |
| 6,747,692 B2 | 6/2004 | Patel et al. |
| 6,765,581 B2 | 7/2004 | Cheng |
| 6,765,612 B1 | 7/2004 | Anderson et al. |
| 6,779,153 B1 | 8/2004 | Kagle |
| 6,785,019 B2 | 8/2004 | Anderson |
| 6,803,945 B1 | 10/2004 | Needham |
| 6,803,950 B2 | 10/2004 | Miyamoto et al. |
| 6,806,906 B1 | 10/2004 | Soga et al. |
| 6,809,737 B1 | 10/2004 | Lee et al. |
| 6,816,596 B1 | 11/2004 | Peinado et al. |
| 6,833,867 B1 | 12/2004 | Anderson |
| 6,847,388 B2 | 1/2005 | Anderson |
| 6,873,357 B2 | 3/2005 | Fuchimukai |
| 6,897,891 B2 | 5/2005 | Itsukaichi |
| 6,903,762 B2 | 6/2005 | Prabhu et al. |
| 6,906,751 B1 | 6/2005 | Norita et al. |
| 6,914,626 B2 | 7/2005 | Squibbs |
| 6,937,356 B1 | 8/2005 | Ito et al. |
| RE38,896 E | 11/2005 | Anderson |
| 6,963,363 B1 | 11/2005 | Ohmura |
| 6,965,400 B1 | 11/2005 | Haba et al. |
| 6,975,746 B2 | 12/2005 | Davis et al. |
| 6,987,862 B2 | 1/2006 | Rhoads |
| 7,003,132 B2 | 2/2006 | Rhoads |
| 7,024,393 B1 | 4/2006 | Peinado et al. |
| 7,039,873 B2 | 5/2006 | Morris |
| 7,043,048 B1 | 5/2006 | Ellingson |
| 7,050,143 B1 | 5/2006 | Silverbrook et al. |
| 7,050,603 B2 | 5/2006 | Rhoads et al. |
| 7,079,177 B2 | 7/2006 | Okazaki et al. |
| RE39,213 E | 8/2006 | Anderson et al. |
| 7,084,903 B2 | 8/2006 | Narayanaswami et al. |
| 7,092,024 B2 | 8/2006 | Kawamura et al. |
| 7,106,376 B1 | 9/2006 | Anderson |
| 7,107,516 B1 | 9/2006 | Anderson |
| 7,113,208 B1 | 9/2006 | Saga |
| 7,215,371 B2 | 5/2007 | Fellegara et al. |
| 7,259,783 B2 | 8/2007 | Anderson |
| 7,262,769 B2 | 8/2007 | Hoppe et al. |
| 7,292,267 B2 | 11/2007 | Prentice |
| 7,337,403 B2 | 2/2008 | Pavley |
| 7,379,097 B2 | 5/2008 | Anderson |
| RE40,865 E | 8/2009 | Anderson |
| RE41,014 E | 11/2009 | Anderson |
| RE41,088 E | 1/2010 | Anderson |
| 2001/0010543 A1 | 8/2001 | Ward et al. |
| 2001/0012062 A1 | 8/2001 | Anderson |
| 2001/0014910 A1 | 8/2001 | Bobo |
| 2001/0014968 A1 | 8/2001 | Mohammed |
| 2001/0049758 A1 | 12/2001 | Shigetomi et al. |
| 2001/0050711 A1 | 12/2001 | Karube et al. |
| 2002/0054116 A1 | 5/2002 | Pavley et al. |
| 2002/0093567 A1 | 7/2002 | Cromer et al. |
| 2002/0093573 A1 | 7/2002 | Cromer et al. |
| 2002/0105582 A1 | 8/2002 | Ikeda |
| 2002/0109782 A1 | 8/2002 | Ejima |
| 2003/0008662 A1* | 1/2003 | Stern et al. .................. 455/456 |
| 2003/0112346 A1 | 6/2003 | Owlett et al. |
| 2003/0122950 A1 | 7/2003 | Anderson |
| 2003/0169350 A1 | 9/2003 | Wiezel |
| 2003/0179301 A1 | 9/2003 | Feldis et al. |
| 2003/0195855 A1 | 10/2003 | Parks et al. |
| 2003/0223614 A1 | 12/2003 | Robins et al. |
| 2004/0021669 A1 | 2/2004 | Fredlund et al. |
| 2004/0098601 A1 | 5/2004 | Epstein |
| 2004/0125982 A1 | 7/2004 | Kacker et al. |
| 2004/0158712 A1 | 8/2004 | Lee et al. |
| 2005/0073725 A1 | 4/2005 | Lim |
| 2005/0226461 A1 | 10/2005 | Goldberg et al. |
| 2005/0280723 A1 | 12/2005 | Ohmura |
| 2005/0286736 A1 | 12/2005 | Rhoads |
| 2006/0029296 A1* | 2/2006 | King et al. .................. 382/313 |
| 2006/0125930 A1 | 6/2006 | Mindrum et al. |
| 2006/0136339 A1 | 6/2006 | Kim et al. |
| 2006/0174326 A1 | 8/2006 | Ginter et al. |
| 2006/0184454 A1* | 8/2006 | Ananda .......................... 705/57 |
| 2006/0200260 A1 | 9/2006 | Hoffberg |
| 2006/0242248 A1 | 10/2006 | Kokkinen |
| 2006/0280246 A1* | 12/2006 | Alattar et al. ............ 375/240.15 |
| 2007/0061594 A1 | 3/2007 | Ginter et al. |
| 2007/0129012 A1* | 6/2007 | Snow .......................... 455/26.1 |
| 2007/0189333 A1* | 8/2007 | Naaman et al. ................ 370/477 |
| 2007/0220575 A1 | 9/2007 | Cooper et al. |
| 2007/0285523 A1 | 12/2007 | Ward et al. |
| 2008/0037826 A1* | 2/2008 | Sundstrom et al. ........... 382/103 |
| 2008/0052026 A1* | 2/2008 | Amidon et al. ............... 702/104 |

FOREIGN PATENT DOCUMENTS

| | | |
|---|---|---|
| EP | 0059435 A2 | 9/1982 |
| EP | 0122094 A2 | 10/1984 |
| EP | 0149196 A2 | 7/1985 |
| EP | 0361739 A2 | 4/1990 |
| EP | 0421769 A2 | 4/1991 |
| EP | 0422447 A2 | 4/1991 |
| EP | 0431581 A2 | 6/1991 |
| EP | 0439087 A2 | 7/1991 |
| EP | 0463856 A2 | 1/1992 |
| EP | 0481145 A2 | 4/1992 |
| EP | 0519379 A2 | 6/1992 |
| EP | 0528084 A1 | 2/1993 |
| EP | 0542377 A2 | 5/1993 |
| EP | 0543414 A2 | 5/1993 |
| EP | 0555048 A2 | 8/1993 |
| EP | 0568468 A2 | 11/1993 |
| EP | 0587161 A2 | 3/1994 |
| EP | 0650125 A1 | 4/1994 |
| EP | 0617542 A2 | 9/1994 |
| EP | 0650125 A1 | 4/1995 |
| EP | 0651553 A1 | 5/1995 |
| EP | 0659017 A2 | 6/1995 |
| EP | 0661658 A2 | 7/1995 |
| EP | 0664475 A1 | 7/1995 |

(56) References Cited

FOREIGN PATENT DOCUMENTS

| | | |
|---|---|---|
| EP | 0664526 A2 | 7/1995 |
| EP | 0664527 A1 | 7/1995 |
| EP | 0675648 A2 | 10/1995 |
| EP | 0549689 B1 | 12/1995 |
| EP | 0729271 A2 | 8/1996 |
| EP | 0730368 A2 | 9/1996 |
| EP | 0736841 A2 | 10/1996 |
| EP | 0738075 A2 | 10/1996 |
| EP | 0449106 B1 | 12/1996 |
| EP | 0549684 B1 | 2/1997 |
| EP | 0786688 A2 | 7/1997 |
| EP | 0817476 A2 | 1/1998 |
| EP | 0821522 A2 | 1/1998 |
| EP | 0835011 A1 | 4/1998 |
| EP | 0851277 A2 | 7/1998 |
| EP | 0851675 A2 | 7/1998 |
| EP | 0860735 A2 | 8/1998 |
| EP | 0860982 A2 | 8/1998 |
| EP | 0767941 B1 | 10/1998 |
| EP | 0890919 A1 | 1/1999 |
| EP | 0600410 B1 | 6/2001 |
| GB | 2211707 A | 7/1989 |
| GB | 2245749 A | 1/1992 |
| GB | 2289555 A | 11/1995 |
| GB | 2295936 A | 6/1996 |
| GB | 2307371 A | 5/1997 |
| JP | S54-087128 | 7/1979 |
| JP | 55-142470 A | 11/1980 |
| JP | 55-142471 A | 11/1980 |
| JP | S57-013479 A | 1/1982 |
| JP | S58-182976 A | 10/1983 |
| JP | S58-222382 A | 12/1983 |
| JP | S59-062891 A | 4/1984 |
| JP | S60-053379 A | 3/1985 |
| JP | S60-067981 A | 4/1985 |
| JP | S61-062281 A | 3/1986 |
| JP | S62-067981 A | 3/1987 |
| JP | S62-173509 A | 7/1987 |
| JP | 62-271178 A | 11/1987 |
| JP | S62-299881 A | 12/1987 |
| JP | 563-303583 A | 12/1988 |
| JP | S63-303583 A | 12/1988 |
| JP | 1-132173 A | 5/1989 |
| JP | H01-130675 A | 5/1989 |
| JP | H01-180532 A | 7/1989 |
| JP | H01-277285 A | 7/1989 |
| JP | 1-238382 A | 9/1989 |
| JP | H01-306973 A | 11/1989 |
| JP | 1-319870 A | 12/1989 |
| JP | H01-314382 A | 12/1989 |
| JP | 2-42489 A | 2/1990 |
| JP | H02-056532 A | 2/1990 |
| JP | H02-058737 A | 2/1990 |
| JP | 2-162420 A | 6/1990 |
| JP | 2-257262 A | 10/1990 |
| JP | 2-280484 A | 11/1990 |
| JP | H02-278973 A | 11/1990 |
| JP | 3-117181 A | 5/1991 |
| JP | 3-231574 A | 10/1991 |
| JP | H03-222582 A | 10/1991 |
| JP | 3-246766 A | 11/1991 |
| JP | 3-506111 A | 12/1991 |
| JP | H04-036644 A | 2/1992 |
| JP | 4-115788 A | 4/1992 |
| JP | 4-120889 A | 4/1992 |
| JP | H04-120889 A | 4/1992 |
| JP | 4-230517 A | 8/1992 |
| JP | H04-236588 A | 8/1992 |
| JP | H04-243487 A | 8/1992 |
| JP | 4-302886 A | 10/1992 |
| JP | 4-506144 A | 10/1992 |
| JP | 4-372070 A | 12/1992 |
| JP | 5-14847 A | 1/1993 |
| JP | H05-037887 A | 2/1993 |
| JP | H05-064062 A | 3/1993 |
| JP | H05-073011 A | 3/1993 |
| JP | 5-91452 A | 4/1993 |
| JP | 5-108785 A | 4/1993 |
| JP | 5-115027 A | 5/1993 |
| JP | 5-131779 A | 5/1993 |
| JP | 5-150308 A | 6/1993 |
| JP | H5-183789 A | 7/1993 |
| JP | 5-207343 A | 8/1993 |
| JP | H5-207343 A | 8/1993 |
| JP | H05-219422 A | 8/1993 |
| JP | H05-219429 A | 8/1993 |
| JP | H05-219430 A | 8/1993 |
| JP | 5-260351 A | 10/1993 |
| JP | H05-260398 A | 10/1993 |
| JP | 5-289838 A | 11/1993 |
| JP | 5-290143 A | 11/1993 |
| JP | 5-308617 A | 11/1993 |
| JP | 5-314093 A | 11/1993 |
| JP | 6-57612 A | 3/1994 |
| JP | 6-60078 | 3/1994 |
| JP | 6-60078 A | 3/1994 |
| JP | 6-78260 A | 3/1994 |
| JP | H6-86107 A | 3/1994 |
| JP | 6-103352 A | 4/1994 |
| JP | 6-105266 A | 4/1994 |
| JP | 6-178261 A | 6/1994 |
| JP | 6-197299 A | 7/1994 |
| JP | 6-265794 A | 9/1994 |
| JP | H06-273819 A | 9/1994 |
| JP | 6-290103 A | 10/1994 |
| JP | H06-301341 A | 10/1994 |
| JP | 6-348467 A | 12/1994 |
| JP | 6-350949 A | 12/1994 |
| JP | 7-6028 A | 1/1995 |
| JP | H07-005601 A | 1/1995 |
| JP | H07-023280 A | 1/1995 |
| JP | H07-028757 A | 1/1995 |
| JP | H07-036422 A | 2/1995 |
| JP | H07-075048 A | 3/1995 |
| JP | H07-079375 A | 3/1995 |
| JP | H07-095466 A | 4/1995 |
| JP | H07-104889 A | 4/1995 |
| JP | H07-128702 A | 5/1995 |
| JP | H07-128792 A | 5/1995 |
| JP | 7-160842 A | 6/1995 |
| JP | H07-143434 A | 6/1995 |
| JP | 7-168852 A | 7/1995 |
| JP | 7-184160 A | 7/1995 |
| JP | H07-168529 A | 7/1995 |
| JP | 7-221911 A | 8/1995 |
| JP | 7-245723 A | 9/1995 |
| JP | 7-274060 A | 10/1995 |
| JP | 7-274108 A | 10/1995 |
| JP | H07-284050 A | 10/1995 |
| JP | H07-287689 A | 10/1995 |
| JP | 7-295873 A | 11/1995 |
| JP | H07-311402 A | 11/1995 |
| JP | H07-311403 A | 11/1995 |
| JP | 08-022343 A | 1/1996 |
| JP | H08-019023 A | 1/1996 |
| JP | 8-32847 A | 2/1996 |
| JP | H08-056323 A | 2/1996 |
| JP | 8-502840 A | 3/1996 |
| JP | 8-111845 A | 4/1996 |
| JP | H08-088870 A | 4/1996 |
| JP | H08-095111 A | 4/1996 |
| JP | H08-097854 A | 4/1996 |
| JP | 8-114849 A | 5/1996 |
| JP | 8-116476 A | 5/1996 |
| JP | 8-140025 A | 5/1996 |
| JP | H08-129216 A | 5/1996 |
| JP | H08-129438 A | 5/1996 |
| JP | H08-129557 A | 5/1996 |
| JP | 8-147952 A | 6/1996 |
| JP | H08-184892 A | 7/1996 |
| JP | H08-190145 A | 7/1996 |
| JP | 8-205014 A | 8/1996 |
| JP | 8-223524 A | 8/1996 |
| JP | H08-223520 A | 8/1996 |

(56) References Cited

FOREIGN PATENT DOCUMENTS

| | | | |
|---|---|---|---|
| JP | 8-249450 A | 9/1996 |
| JP | 8-279034 A | 10/1996 |
| JP | H08-256325 A | 10/1996 |
| JP | H08-317276 A | 11/1996 |
| JP | 8-331495 A | 12/1996 |
| JP | 8-339297 A | 12/1996 |
| JP | H08-336069 A | 12/1996 |
| JP | 9-27939 A | 1/1997 |
| JP | H09-018813 A | 1/1997 |
| JP | H09-027939 A | 1/1997 |
| JP | 9-37139 A | 2/1997 |
| JP | H09-044143 A | 2/1997 |
| JP | H09-046776 A | 2/1997 |
| JP | H09-065345 A | 3/1997 |
| JP | H09-069972 A | 3/1997 |
| JP | H09-083853 A | 3/1997 |
| JP | H09-083981 A | 3/1997 |
| JP | H09-098373 A | 4/1997 |
| JP | 9-163275 A | 6/1997 |
| JP | 9-171213 A | 6/1997 |
| JP | H09-197547 A | 7/1997 |
| JP | H9-266561 A | 10/1997 |
| JP | H09-307803 A | 11/1997 |
| JP | H09-307804 A | 11/1997 |
| JP | 9-311850 A | 12/1997 |
| JP | 10-4535 A | 1/1998 |
| JP | 10-162020 A | 6/1998 |
| JP | H10-164401 A | 6/1998 |
| JP | H10-164426 A | 6/1998 |
| JP | H10-336503 A | 7/1998 |
| JP | H10-210405 A | 8/1998 |
| JP | 10-243331 A | 9/1998 |
| JP | H11-191858 A | 7/1999 |
| JP | H11-196397 A | 7/1999 |
| JP | 2000-92439 A | 3/2000 |
| JP | 2000-510616 A | 8/2000 |
| JP | 2000-287110 A | 10/2000 |
| JP | 2001-501416 A | 1/2001 |
| WO | 90/09717 A1 | 8/1990 |
| WO | 91/00586 A1 | 1/1991 |
| WO | WO-91/14334 A1 | 9/1991 |
| WO | WO-92/05652 A2 | 4/1992 |
| WO | WO-92/05655 A1 | 4/1992 |
| WO | WO-92/09169 A1 | 5/1992 |
| WO | 92/10063 A1 | 6/1992 |
| WO | WO-92/20186 A1 | 11/1992 |
| WO | WO-94/23375 A1 | 10/1994 |
| WO | WO-95/32583 A1 | 11/1995 |
| WO | 96/00952 A1 | 1/1996 |
| WO | WO-96/02106 A1 | 1/1996 |
| WO | 96/24216 A1 | 8/1996 |
| WO | WO-96/29818 A1 | 9/1996 |
| WO | WO-97/17669 A1 | 5/1997 |
| WO | 97/28516 A1 | 8/1997 |
| WO | WO-97/38510 A1 | 10/1997 |
| WO | 98/14863 A1 | 4/1998 |
| WO | WO-98/14887 A1 | 4/1998 |

OTHER PUBLICATIONS

"Photo Secretary for Nikon F5—Index page," Mir.com Website, 2002, http://www.mir.com.my/rb/photography/hardwares/classics/NikonF5/accessories/PhotoS, visited Nov. 24, 2010.
"Kodak Digital Science: DC 120 Zoom Camera," Web Archive, http://web.archive.org/web/19970605073556/www.kodak.com/productInfo/technicalInfo/, visited Nov. 29, 2010, 3 pages.
"Digita Post 1.0 User Guide—Draft in Progress," FlashPoint Technology, Inc., 1999, 47 pages.
"Debut of Nikon F5," Nikon Imaging Products, from Nikon website http://imaging.nikon.com/products/imaging/technology/d-archives/history-f5/index.htm, visited on Dec. 17, 2010, 9 pages.
Gerard, Alexis, "Interview Live Picture CEO John Sculley—Part 2," The Future Image Report, vol. 3, Issue 8, Jan./Feb. 1996, 12 pages.
Anderson, Eric, "Resume, Autobiography, and Articles," Apr. 3, 2001, Web.Archive.org website http://web.archive.org/web/20010421163105/http://www.2live4.com/resume.htm, 196 pages.
"TWAIN Toolkit, Edition 2," Feb. 1996 (TWAIN Version 1.6), pp. 1-345.
Acton, Scott T., "Expert Report of Dr. Scott T. Acton Regarding Invalidity of U.S. Patents Nos. 6,134,606, 6,163,816, and 6,262,769," Jan. 7, 2011, provided as part of Investigation No. 337-TA-726, United States International Trade Commission.
Paskins, Adrian, "The IEEE 1394 Bus," May 12, 1997, IEE Half-Day Colloquium on New High Capacity Digital Media and Their Applications (Digest No. 1997/114), pp. 4/1-4/6, IEEE.
Castleman, Kenneth R., "Expert Report of Dr. Castleman Regarding Invalidity of U.S. Patent Nos. 6,134,606; 6,163,816; and 6,262,769," Jan. 7, 2011, submitted as part of Investigation No. 337-TA-726, United States International Trade Commission.
Olivier, James L., "Expert Report of James L. Olivier, Ph.D.," Jan. 7, 2011, submitted as part of Investigation No. 337-TA-726, United States International Trade Commission.
"Sony Parts for Professional Products," Sony website (https://www.servicesplus.sel.sony.com/PartsPlusResults.aspx?stype=parts), accessed online Nov. 2, 2010.
Kelly-Mahaffey, L., "Graph Data Structure for Digital Camera User Interface," original publication date May 1, 1994, IP.com Prior Art Database, IPCOM000112537D, IP.com electronic publication date Mar. 27, 2005, 2 pages.
Gerard, Alexis, "A Conversation with Don Strickland—Part 1," The Future Image Report, vol. 4, Issue 7, Dec. 1996, 12 pages.
"Nikon Photo Secretary for F5 AC-1WE/AC-1ME" Nikon Website, http://www.nikon.com/about/news/1997/may02_97.htm, visited Nov. 24, 2010, 2 pages.
"Kodak Digital Science: Kodak Imaging Software Available with Kodak Digital Science Products," Apr. 14, 1997, Web Archive, http://web.archive.org/web/19970523081910/www.kodak.com/aboutKodak/corpInfo/, visited Nov. 29, 2010, 5 pages.
"Kodak Digital Science: Kodak Point-and-Shoot Digital Cameras at a Glance," Apr. 14, 1997, Web Archive, http://web.archive.org/web/19970523081916/www.kodak.com/aboutKodak/corpInfo/, visited Nov. 29, 2010, 4 pages.
*Sony Digital Still Camera DSC-F1 Operating Instructions*, pp. 1-6, 16-17, 22-25, and 57-58, published 1996.
Steinfield, Edward, "Leveraging Browsers as Universal GUIs," *EE Times*, Issue 932, Dec. 16, 1996, 4 pages.
*Liquid Crystal Digital Camera QV-10B Owner's Manual*, Casio, 1995, pp. 1-89, Casio Computer Co., Ltd.
"Kodak Digital Science DC220 and DC260 Cameras: Scripts Development Guide Script User Interface Design Guidelines," Eastman Kodak Company, 1998, 18 pages.
"Kodak Digital Science DC220 and DC260 Cameras: Scripts Development Guide Guidelines for Technical Design," Eastman Kodak Company, 1998, 20 pages.
"About Kodak Digital Access TWAIN Acquire Software," 5 pp.
"Image File Tags," Digita by FlashPoint, 51 pages.
"Getting Started With DigitaTM FX," FlashPoint Technology, Inc., 1999, 3 pages.
Henning, Tony, "FlashPoint History Draft," FlashPoint Technology, Inc., 16 pages.
Richter, Jake, "Curriculum Vitae," 23 pages.
Anderson, Eric et al., "Aspen Digital Electronic Camera: Draft Engineering Requirement Specification Version 1.0d3," Apple Computer, Inc., Feb. 10, 1994, 16 pages.
"Summary of DC220/DC260 USB Performance Spreadsheet," 2 pages.
"Company and Product List," 1 page.
Anderson, Eric et al., "Phobos Digital Electronic Camera: Draft Engineering Requirement Specification Version 1.0d1," Apple Computer, Inc., Feb. 4, 1994, 17 pages.
Bing-You, Patty, Ed., "Apple Directions: The Developer Business Report," Jul. 1997, 16 pages.
Gerard, Alexis, "FlashPix Takes the Lead in Cross-Media Print and Web Document Publishing," The Future Image Report, Aug./Sep. 1998 vol. 6, Issue 4, 16 pages.

(56) References Cited

OTHER PUBLICATIONS

"Nikon F5 User's Guide (1996-2004)," KenRockwell.com, 2010, website http://www.kenrockwell.com/nikon/f5/usersguide.htm, visited Nov. 24, 2010, 18 pages.
"Service Manual for the Kodak Digital Science DC220/260/265 Cameras Service Code 3195," Eastman Kodak Company, Apr. 8, 1999, 130 pages.
"Service Manual for the Kodak Digital Science DC220/260 Cameras Service Code 3195," Eastman Kodak Company, Aug. 14, 1998, 108 pages.
"Kodak Digital Science: DC120 Zoom Digital Camera Software," Eastman Kodak Company, 1997, 4 pages.
"Quick Take 100/Venus/DS205AA: Validation Test Report with Data," Chinon Industries, Inc., Dec. 3, 1993, 81 pages.
"Kodak DC265 Zoom Digital Camera User's Guide for the Camera and Kodak Software," Eastman Kodak Company, 146 pages.
"Test Report: Safety Reports," Underwriters Laboratories, Inc., Dec. 15, 1993, 88 pages.
"Kodak Digital Science DC220/DC260 Zoom Camera Software Development Kit Library Reference Manual Version 1.0," Eastman Kodak Company, May 1998, 104 pages.
Anderson, Eric, "Resume, Autobiography, and Articles," Apr. 3, 2001, Web.Archive.org website http://web.archive.org/web/20010421163105/http://www.2live4.com/resume.htm, 196 pages.
"Kodak's Manufacturing Capabilities," Presentation, Eastman Kodak Company, 196 pages.
Mehta, Rajiv, "Venus Product Intro. Plan," Apple, Imaging Product Marketing, Sep. 26, 1993, 50 pages.
"Nikon F5 Instruction Manual," Nikon Corporation, 170 pages.
"Camera Capabilities Parameters," Digita by FlashPoint, 105 pages.
"Apple Announces Apple Image Capture Platform," PR Newswire May 13, 1996, The Free Library by Farlex, website http://www.thefreelibruary.com/APPLE+ANNOUNCES+APPLE+IMAGE+CAPTURE, visited Oct. 15, 2010, 4 pages.
"Motorola's MPC823 Microprocessor Provides Enhanced Capabilities for Apple's Image Capture Platform," PR Newswire May 14, 1996, The Free Library by Farlex, website http://www.thefreelibruary.com/MOTOROLA'S+MPC823+MICROPROCESSOR, visited Dec. 17, 2010, 4 pages.
"HTC id:101," HTC, 666 pages.
"Instructions from Dimage V Main Panel," Dimage V Main Panel, pp. 29-60.
"Dimage V Viewer Panel Instructions," Viewer and Image Panel Functions, pp. 25-48.
"1394-based Digital Camera Specification," 1394 Trade Association, Version 1.04, Aug. 9, 1996, pp. 1-20.
"TWAIN Toolkit, Edition 2," Feb. 1996 (TWAIN Version '1.6), pp. 1-345.
Acton, Scott T., "Expert Report of Dr. Scott T. Acton Regarding Invalidity of U.S. Pat. Nos. 6,134,606, 6,163,816, and 6,262,769," Jan. 7, 2011, provided as part of Investigation No. 337-TA-726, United States International Trade Commission.
Paskins, Adrian, "The IEEE 1394 Bus," May 12, 1997, IEE Half-Day Colloquium on New High Capacity Digital Media and Their Applications (Digest No: 1997/114), pp. 4/1-4/6, IEEE.
"TWAIN Working Group Releases TWAIN 1.6 Specification," TWAIN Press Release dated Apr. 16, 1996, accessed online on Aug. 16, 2010 from http://web.archive.org/web/19970418013323/www.twain.org.
MacNeil, David, "Digital Camera Guide to Electronic Photography and Imaging," Dec. 1998, Digital Camera Magazine, 2 pages.
Eggars, Ron, "Petersen's Digital Photo: Eliminating the Computer for Special Effects," Digital Effects How to, A Supplement to Petersen's Photographic Magazine, 1 page.
Vizard, Frank et al., "Shutterbugs, It May Be Time to Go Digital," BusinessWeek, Sep. 1998, 2 pages.
Yoshida, Reiji, "Digital Cameras Claim Ever Bigger Chunk of Market," The Japan Times, Aug. 21, 2003.
Huske, Gibboney, "Pixels & Profit$ (The Economics of the Transition to Digital Imaging)," vol. 1, No. 3, Desk Notes, Credit Suisse First Boston Corporation, 6 pages.
Etchells, Robert David, "Expert Report of Mr. Robert David Etchells," Jan. 6, 2010, provided as part of Investigation No. 337-TA-726, United States International Trade Commission.
"Nikon Digital Still Camera E2/E2s Instruction Manual," Nikon Corporation, 51 pages.
"Sharp Model VL-DC1H Operation Manual," Sharp Corporation, Osaka, Japan, 91 pages.
Lim, Sukhwan et al., "Integration of Image Capture and Processing—Beyond Single Chip Digital Camera," Proceedings of the SPIE, vol. 4306, pp. 219-226 (2001).
Castleman, Kenneth R., "Expert Report of Dr. Castleman Regarding Invalidity of U.S. Pat. No. 6,134,606; 6,163,816; and 6,262,769," Jan. 7, 2011, submitted as part of Investigation No. 337-TA-726, United States International Trade Commission.
Azinger, Eric, "Radius Display Can Fit Different Orientations," InfoWorld Magazine, vol. 13, No. 29, Jul. 22, 1991, p. 69.
"Report Card—Macintosh Monitor—Radius Pivot Monitor," InfoWorld Magazine, vol. 12, No. 17, Apr. 23, 1990, p. 87.
Lewis, Peter H., "Personal Computers: Looking at Life from Both Sides," New York Times, at C7, Apr. 17, 1990.
Busch, David D., "Swivel Your Image with Portrait Display Labs' Pivot 1700," Computer Shopper Magazine, p. 545, Dec. 1, 1995.
Klein, W. F., "Cathode-Ray Tube Rotating Apparatus," IBM Technical Disclosure Bulletin, vol. 18, No. 11, Apr. 1976, 3 pages.
Hiroshi, Hiraku, "Personal Digital Cameras for Sale Later this Year that Minolta," PC Watch, Sep. 2, 1996, from http://translate.googleusercontent.com/translate, visited Dec. 17, 2010, 2 pages.
Kelly-Mahaffey, L, "Graph Data Structure for Digital Camera User Interface," original publication date May 1, 1994, IP.com Prior Art Database, IPCOM000112537D, IP.com electronic publication date Mar. 27, 2005, 2 pages.
Alexander, J. F. et al., "Multi-Function Digital Camera Information Method," original publication date Aug. 1, 1994, IP.com Prior Art Database, IPCOM000113280D, IP.com electronic publication date Mar. 27, 2005, 2 pages.
Mosley, J. el al., "Projection Means for Displaying Horizontal and Vertical Images," original publication date Dec. 1, 1995, IP.com Prior Art Database, IPCOM000117074D, IP.com electronic publication date Mar. 31, 2005, 3 pages.
Gerard, Alexis, "A Conversation with Don Strickland — Part 1," The Future Image Report, vol. 4, Issue 7, Dec. 1996, 12 pages.
Trumble, Ann, "QuickTake 150 User's Guide (for Macintosh) Alpha Draft and Memo," Apple Computer, Inc., Dec. 5, 1994, 60 pages.
Trumble, Ann, "QuickTake 150 User's Guide (for Windows) Alpha Draft and Memo," Apple Computer, Inc., Dec. 12, 1994, 40 pages.
Newby, Kris, "Apple's New Image-Capture Platform," Apple Directions, 2000, Web.Archive.org website http://web.archive.org/web/20000418124226/devworld.apple.com/mkt/informed, visited Oct. 15, 2010, 9 pages.
"Liquid Crystal Digital Camera QV-120 Owner's Manual," Casio, 35 pages.
"QV-Link for Macintosh LK-2V & QV-Link for Windows LK-10V: Connection Kit of the Casio Liquid Crystal Digital Camera," Casio Computer Company, Ltd., 57 pages.
"Casio Digital Cameras Owner's Manual: For Acquisition Module TWAIN Data Source for Windows," Casio, 14 pages.
"Liquid Crystal Digital Camera QV-10A Owner's Manual," Casio, 41 pages.
"Liquid Crystal Digital Camera QV-11 Owner's Manual," Casio, 37 pages.
"A Monitor to Flip Over," Byte, A McGraw-Hill Publication, Oct. 1991, vol. 16, No. 10, 13 pages.
Castleman, Kenneth R., "Digital Image Processing," Prentice Hall, Inc., 1996, 671 pages.
Richter, Gunter, "Magic Lantern Guide to Nikon F5," Silver Pixel Press, 1997, 194 pages.
Huber, Michael, et al., "Magic Lantern Guide to Nikon N90s F90X," Silver Pixel Press, 1995, 202 pages.
London, Barbara et al., "Photography," Fifth Edition, HarperCollins College Publishers, 1994, 434 pages.

(56) References Cited

OTHER PUBLICATIONS

London, Barbara et al., "Photography," Sixth Edition, Addison Wesley Longman, Inc., 1998, 411 pages.
"Kodak: How to Take Good Pictures," Silver Pixel Press, Sep. 1995, 98 pages.
Adams, Ansel, "The Camera: The Ansel Adams Photography Series 1", Little, Brown and Company, 2009, 219 pages.
Adams, Ansel, "The Negative: The Ansel Adams Photography Series 2", Little, Brown and Company, 2010, 288 pages.
Adams, Ansel, "The Print: The Ansel Adams Photography Series 3", Little, Brown and Company, 2009, 222 pages.
"Apple Image Capture Platform Presentation: Apple Image Capture Team," Apple, 13 pages.
"Nikon Photo Secretary for F5 AC-1WE/AC-1ME" Nikon Website, http://www.nikon.com/about/news/1997/may02_97. htm, visited Nov. 24, 2010, 2 pages.
Lee, Danny, "Pivot 1700: A New Pivoting Monitor," Macworld Magazine, Mar. 1, 1996, 4 pages.
"Reviews Pivot Monitors for Mac," Info World: The Weekly for Personal Computing Professionals, vol. 12, Issue 17, Apr. 23, 1990, 4 pages.
"Kodak Digital Science: Kodak Imaging Software Available with Kodak Digital Science Products," Apr. 14, 1997, Web Archive, http://web.archive.org/web/19970523081910/www.kodak.com/aboutKodak/corpInfo/, visited Nov. 29, 2010, 5 pages.
"Kodak Digital Science: Kodak Point-and-Shoot Digital Cameras at a Glance," Apr. 14, 1997, Web Archive, http://web.archive.org/web/19970523081916/www.kodak.com/aboutKodak/corpInfo/, visited Nov. 29, 2010, 4 pages.
"Personal Workstation User Guide: The Corvus Concept," Corvus Systems, Inc., Feb. 1983, 26 pages.
Russell, Desiree, "Apple_MPC823 Final.txt Press Release," Cunningham Communication, Inc., Apple, and Motorola, May 15, 1996, 2 pages.
Baker, R. G. et al., "Enhanced Electronic Camera," original publication date Mar. 1, 1995, IP.com Prior Art Database, IPOCOm000115024D, IP.com electronic publication date Mar. 30, 2005, 3 pages.
"QuickTime Image Capture User Interface Application Interface Specifications for Macintosh and Windows v1.0a1," Apple, 36 pages.
"Apple Directions: Aug. 1996," Web.Archive.org Website last modified Jan. 23, 1997, http://web.archive.org/web/19970615222044/www.devworld.apple.com/mkt/informed, visited Oct. 15, 2010.
"Nikon AC-1 WE Photo Secretary for F5 for Windows 95," Floppy Disk Package, Nikon Corporation, 1997, 6 pages.
"Nikon AC-1WE (Ver.1.01) Photo Secretary for F5 for Windows 95 Disk 1 and Disk 2," Nikon Corporation, 1997, 2 pages.
"Dimage V Digital Image Camera," Packaging, Minolta, 7 pages.
"Kodak Digital Science DC120 Zoom Digital Camera," Packaging, Eastman Kodak Company, 1997, 6 pages.
"DSC-F1 Service Manual US Model and Canadian Model," Sony Digital Still Camera, 49 pages.
"Sharp Electronic Organizer Wizard Model OZ-8000/OZ-8200 Operation Manual," Sharp Corporation, 1990, 121 pages.
"Kodak Digital Science DC120 Zoom Digital Camera User's Guide for Camera and Software," Eastman Kodak Company, 110 pages.
"Nikon AC-1WE Photo Secretary for F5 Instruction Manual," Nikon Corporation, 28 pages.
"Nikon N90s AF Instruction Manual," Nikon Corporation, 148 pages.
Blickenstorfer, Conrad H. Ed., "Pen Computing: Covering Mobile Computing & Communications," Group Publisher Howard Borgen, Apr. 1997, vol. 4, No. 15, 104 pages.
Blickenstorfer, Conrad H. Ed., "Pen Computing: Covering Mobile Computing & Communications," Group Publisher Howard Borgen, Nov. 1995, vol. 2, No. 7, 100 pages.
"Data Link Card AC-2E," Packaging, Nikon Corporation, 1993, 6 pages.
"Kodak Digital Science DC220 Zoom Camera, Kodak Digital Science DC260 Zoom Camera, Kodak DC265 Zoom Digital Camera, Kodak DC290 Zoom Digital Camera Software Development Kit Library Reference Manual Version 0.4," Eastman Kodak Company, Aug. 6, 1999, 114 pages.
"Kodak Digital Science DC220 Zoom Camera, Kodak Digital Science DC260 Zoom Camera, Kodak DC265 Zoom Digital Camera, Kodak DC290 Zoom Digital Camera Software Development Kit Library Reference Manual Version 0.7," Eastman Kodak Company, Nov. 15, 1999, 118 pages.
"Nikon N90 AF Instruction Manual," Nikon Corporation, Distributed by www.lensinc.net, 148 pages.
Doyle, B., "Windows Video Capture Cards," New Media, Nov. 1994, pp. 77-94.
"Data Link Card AC-2E Instruction Manual," Nikon Corporation, 95 pages.
"Sony PC Connecting Kit Operating Instructions," Sony Corporation, 1997, 127 pages.
"Sony Digital Still Camera Operating Instructions DSC-F1," Sony Corporation, 1996, 60 pages.
"Sony Digital Still Camera Digital Mavica MVC-FD5/MVC-FD7," Sony Corporation, 1997, 136 pages.
"Minolta Digital Camera Dimage V E Instructional Manual," Minolta Company, Ltd., 1997, 85 pages.
"TIFF Revision 6.0 Final Specification," Adobe Developers Association, Jun. 3, 1992, 121 pages.
Want, Roy et al., "An Overview of the ParcTab Ubiquitous Computing Experiement," IEEE Personal Communications, Dec. 1995, 16 pages.
Wetzel, Alan T., "Consumer Applications of the IEEE 1394 Serial Bus, and a 1394/DV Video Editing System," The Institute of Electrical and Electronic Engineers, Inc., 1996. 12 pages.
Yamashita, Tomokuni et al., "High Quality Digital Camera," ITE Technical Report, vol. 20 No. 58, pp. 75-78.
Matsuda, S. et al., "Digital Communication Camera System," Toshiba Review, vol. 51 No. 2, 1996, pp. 27-30.
"Nikon E2 Series: Nikon Digital Still Cameras," Nikon Corporation, Aug. 1996, 6 pages.
Murata, Kazuhisa, "Kodak Digital Science DC260/DC220 Camera Software Development Kit Library Reference Manual Version 0.93," Eastman Kodak Japan Limited, Feb. 12, 1998, 73 pages.
Murata, Kazuhisa, "Kodak Digital Science DC260/DC220 Camera Software Development Kit Library Reference Manual Version 0.94," Eastman Kodak Japan Limited, Feb. 17, 1998, 74 pages.
Murata, Kazuhisa, "Kodak Digital Science DC260/DC220 Camera Software Development Kit Library Reference Manual Version 0.95," Eastman Kodak Japan Limited, Mar. 12, 1998, 74 pages.
Murata, Kazuhisa, "Kodak Digital Science DC260/DC220 Camera Software Development Kit Library Reference Manual Version 0.96," Eastman Kodak Japan Limited, Mar. 26, 1998, 76 pages.
Murata, Kazuhisa, "Kodak Digital Science DC260/DC220 Camera Software Development Kit Library Reference Manual Version 0.98," Eastman Kodak Japan Limited, Jan. 12, 1998, 63 pages.
Gerard, Alexis, "Interview Live Picture CEO John Sculley," The Future Image Report, vol. 3, Issue 7, Dec. 1995, 12 pages.
Gerard, Alexis, "Interview Live Picture CEO John Sculley —Part 2," The Future Image Report, vol. 3, Issue 8, Jan./Feb. 1996, 12 pages.
Telek, M. et al., "DC 220/260 Twain User Interface (UI) Specification: Document Version 1.8," Kodak, last updated Feb. 20, 1998, 57 pages.
Telek, M. et al., "DC220/260 Twain User Interface (UI) Specification Version 2.1," Eastman Kodak Company, Mar. 19, 1998, 65 pages.
Telek, M. et al., "DC 220/260 Twain User Interface (UI) Specification: Document Version 2.3," Kodak, last updated Apr. 17, 1998, 61 pages.
Telek, M. et al., "DC 220/260 Twain User Interface (UI) Specification: Document Version 2.4," Kodak, last updated Apr. 23, 1998, 61 pages.
Telek, M. et al., "DC 220/260 Twain User Interface (UI) Specification: Document Version 2.5," Kodak, last updated May 6, 1998, 63 pages.
Telek, M. et al., "DC 220/260 Twain User Interface (UI) Specification: Document Version 2.6," Kodak, last updated May 15, 1998, 62 pages.

(56) References Cited

OTHER PUBLICATIONS

"Kodak Digital Science: DC120 Zoom Digital Camera User's Guide," Eastman Kodak Company, 1997, 62 pages.
"Kodak DC25 Digital Camera User's Guide for Camera and Software," Eastman Kodak Company, 47 pages.
"Chinon ES-3000 User's Guide PC and Mac," Chinon Industries, Inc., 1995, 112 pages.
"Dimage V Digital Camera E Software Instruction manual Macintosh Version," Minolta, Company, Ltd., 1997, 44 pages.
"Dimage V Digital Camera E Software Instruction manual Macintosh Version (CD-ROM)," Minolta, Company, Ltd., 1997, 45 pages.
"Kodak Digital Science DC210 Plus Zoom/DC200 Cameras User's Guide," Eastman Kodak Company, 1996, 85 pages.
Kikuchi, Kazuo et al., "Recording Medium for Digital Still Cameras," VLSI Design Department, FUJIFILM Microdevices Co., Ltd., 4 pages.
"Kodak Digital Science: DC120 Zoom Digital Camera Product Page," Web Archive, http://web.archive.org/web/19970523032812/www.kodak.com/daiHome/dc120/, visited Nov. 29, 2010, 2 pages.
"Kodak Digital Science: DC220 Zoom Camera with Picture Easy Software 3.0," Kodak Specification, 1998, 2 pages.
"Kodak Digital Science: DC260 Zoom Camera with Picture Easy Software 3.0," Kodak Specification, 1998, 2 pages.
Yan, Albert et al., "Venus Digital Electronic Camera: Engineering Requirement Specification, Version 1.1," Apple Computer, Inc., Dec. 14, 1993, 50 pages.
"Electromagnetic Compatibility Emissions Test Report: QuickTake 100 Digital Camera," Apple Computer, Inc., Nov. 29, 1993, 13 pages.
"Kodak Digital Science DC120 Zoom Digital Camera: General README Topics," Eastman Kodak Company, Mar. 1997, 3 pages.
"Kodak Digital Science: DC220 Zoom Camera with Picture Easy Software 3.0," Kodak Release, 1998, 4 pages.
"Measurement/Technical Report: Apple QuickTake 100," Apple Computer, Inc., Nov. 12, 1993, 37 pages.
"Kodak Selects SanDisk CompactFlash as the Removable Memory for New Kodak DC120 'MegaPixel' Digital Camera," High Beam Research Website, Apr. 14, 1997 http://www.highbeam.com/doc/1G1-19306123.html, visited Nov. 29, 2010.
"Kodak Digital Zoom Camera Twain Acquire Module," Eastman Kodak Company, 1997, 16 pages.
"Kodak DC40," Future Image Report, Nov. 1995, 2 pages.
Moss, Michael et al., "Letter: CB Certificate and Test Report for Apple Quick Take 100 (Camera) Model M2613," Underwriters Laboratories, Inc., Dec. 15, 1993, 4 pages.
"DC220/DC260 Zoom Camera Firmware Update v1.0.4," Kodak, Oct. 1998, 2 pages.
"Slide Shows: The Minolta Dimage V," Minolta Co., Ltd., 1997, 21 pages.
Alsing, Carl et al., "Digita 1.x.1 Embedded Operating Environment: Arizona Functional Specification," FlashPoint Technology, Inc., Dec. 22, 1998, 6 pages.
"Image Software Development of Alternate Application—Digita FX Meeting Minutes," FlashPoint Technology, Inc., Sep. 23, 1998, 1 page.
Foley et al., *Computer Graphics—Principles and Practice*, Second Edition in C, Addison-Wesley Publishing Company, New York, 1996, pp. 132-137, 506-509, 755-759.
Buderi, Robert, "Photos That Talk," *Upside Today*, Jan. 27, 1999, <http://www.uspide.com/texis/mvm/story?id=36b0cb860>.
*Sony Digital Still Camera DSC-F1 Operating Instructions*, pp. 1-6, 16-17, 22-25, and 57- 58, published 1996.
"Laboratory Analysis—Data Link: The Future of Camera Technology," *Popular Photography*, Sep. 1993, p. 48.
"PCMCIA for PowerBook 500 Series Computers," *AppleFacts Online*, 1994, <http://product.info.apple.com/productinfo/factsheets/pcmcia.html>.
"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.
"What Isn't Obvious in the Patent World," *PATNEWS*, Jan. 30, 1998, email correspondence.
*Laura Lemay's Guide to Sizzling Web Site Design*, Sans.net Publishing, Indianapolis, 1997, pp. 75-77.
"Digitella Technology Solutions Announces ScriptGenerator 1.0, Enabling Users to Easily Develop Software Scripts that Run on Digital Cameras," *PR Newswire*, Oct. 7, 1998.
Grimm, Leigh, "The Manipulation Proclamation," *Photo Trade News*, Feb. 1997, p. 66.
"Kodak DC3400 Zoom—Distinctive New Kodak DC3400 Zoom Digital Camera Offers Easy-to-Use Features, Stylish New Look, All at Affordable Price," *Kodak Press Release*, Aug. 1, 2000.
Hauf et al., "The FlashPix™ Image File Format," *The Fourth Color Imaging Conference: Color Science, Systems and Applications*, 1996, pp. 234-238.
Watanabe et al., "An Image Data File Format for Digital Still Camera," *IS&T's 48th Annual Conference Proceedings*, May 1995, vol. 48, pp. 421-424.
"Disk Drive with Embedded Hyper-Text Markup Language Server," IBM Technical Disclosure Bulletin, vol. 38, No. 12, Dec. 1995, p. 479.
"Phaser® 740L Color-Capable Laser Printer," printed Apr. 15, 1999, <http://www.tek.com/Color_Printers/products/740L/740Lfe.htm>.
"What is PhaserLink Software?," printed Apr. 15, 1999, <http://www.tek.com/Color_Printers/userdoc/PShare3/phlink1.htm>.
Corcoran et al., "A Portable Java API Interface to Simplify User Access to Digital Cameras," IEEE *Transactions on Consumer Electronics*, vol. 44, No. 3, Aug. 1998, pp. 686-691.
Mann, Steve, "Headmounted Wireless Video: Computer-Supported Collaboration for Photojournalism and Everyday Use," *IEEE Communications Magazine*, vol. 36, No. 6, Jun. 1998, pp. 144-151.
Williams, Martyn, "Review—NEC PC-DC401 Digital Still Camera," *AppleLink Newbytes*, Mar. 15, 1996.
Peisel, Bill, "Designing the Next Step in Internet Appliances," *Electronic Design*, Mar. 23, 1998, pp. 50, 52, and 56.
Steinfield, Edward, "Leveraging Browsers as Universal GUIs," *EE Times*, Issue 932, Dec. 16, 1996, 4 pages.
Newby, Kris, "Apple's New Image-Capture Platform," *Apple Directions*, Aug. 1996.
"Device Drivers via the Access Bus," *IBM Technical Disclosure Bulletin*, vol. 39, No. 1, Jan. 1996, pp. 135-136.
Degann et al., "Still Images Retrieval from a Remote Database: The System *Imagine*," *Signal Processing: Image Communication*, vol. 5, No. 3, May 1993, pp. 219-234.
"Getting Started With Your Macintosh LC III," cover and inside cover page, p. 21, 1992.
"User's Guide Microsoft Windows & MS-DOS 6," Microsoft Corporation, pp. iii and 71-75, 1993.
Ide, K., "Color Zaurus," Soft Bank KK, Japan, Aug. 15, 1996, pp. 1-111.
Kodak Professional Digital Camera System (DSC100) User's Manual, Eastman Kodak Company, 1991-1992.
Nikon Digital Camera E100 brochure, Nikon Corporation, Electronic Imaging Division, Sep. 1996.
Canon PowerShot 600 Digital Camera brochure, Canon Computer Systems, Inc., 1996.
Canon PowerShot 350 Digital Camera brochure, Canon Computer Systems, Inc., 1997.
Fujix Digital Card Camera DS-220 brochure, Fuji Photo Film Co., Ltd., 1995.
Epson PhotoPC 500 Color Digital Camera brochure, Seiko Epson Corporation, Oct. 3, 1995.
Okachi et al., "Clear! Simple! Upgraded Digital Photography," *Nikkei Personal Computing*, Nikkei Business Publications, Inc., Japan, Aug. 26, 1996, vol. 271, pp. 236-264.
Kurzidim, "Bildersafari: Foto-Und Videodatenbanken von 100 bis 100000 OM", vol. 9, 1994, pp. 112-114, 116-117, 120-121.
Aker et al., *The Macintosh Bible*, Third Edition, Nov. 1991, pp. 63-64, 324, 931, 945, Goldstein & Blair, Berkeley, California.
*Liquid Crystal Digital Camera QV-101B Owner's Manual*, Casio, 1995, pp. 1-89, Casio Computer Co., Ltd.

(56) References Cited

OTHER PUBLICATIONS

Foley et al., *Introduction to Computer Graphics*, 1994, 1990, pp. 505-509, Addison-Wesley Publishing Company, Inc.
Foley et al., *Computer Graphics—Principles and Practice*, Second Edition, Jun. 15, 1990, pp. 754-759, Addison-Wesley Publication Company, Inc.
*Inside Macintosh*, Apple Computer, 1993, pp. 1-5 to 1-8 and 4-1 to 4-46, Apple Computer Inc., Cupertino, California.
Kroiak et al., "A Declaration of Device Independence," *ESD: The Electronic System Design Magazine*, May 1988, pp. 63-65, vol. 18, No. 5.
Melville et al., "An Application Programmer's Interface for Digital Cameras," Imaging Science and Technology's 49$^{th}$ Annual Conference, May 19-24, 1996, The Society for Imaging Science and Technology.
Picona PC-DC200 PC-DC200K User's Manual, Feb. 1997, NEC Corporation.
Posnak et al., "An Adaptive Framework for Developing Multimedia Software Components," *Communications of the ACM*, Oct. 1997, pp. 43-47, vol. 40, No. 10, ACM.
*Ricoh Digital Camera RDC-1 Instruction Manual*, Ricoh, Ricoh Americas Corp., Ricoh Co., Ltd Japan.
Shimizu et al., "The Digital Camera Using New Compression and Interpolation Algorithm," IS&T 49$^{th}$ Annual Conference, May 19-24, 1996, pp. 268-272, IS&T, Springfield, Virginia.
Skelton et al., "Design and Development of a Transportable Image Processing and GIS System," *Infrared Image Processing and Enhancement*, May 20-21, 1987, pp. 187-191, vol. 781, SPIE, Bellingham, Washington.
*Texas Instruments Ti-85 Guidebook*, 1993, Texas Instruments Incorporated.
*Texas Instruments Ti-92 Guidebook*, 1995, Texas Instruments Incorporated.
*VxWorks Programmer's Guide*, 1984-1999, Wind River Systems, Inc.
Summons to Oral Proceedings for European Patent Application No. 98925090.7, mailed Dec. 17, 2013, 11 pages.
Summons to Oral Proceedings for European Patent Application No. 99905540.3, mailed Jan. 16, 2014, 7 pages.
Decision of Technical Board of Appeal for European Patent Application No. 98925090.7, mailed Jun. 17, 2014, 19 pages.
"Apple Quick Take 100: User's Guide for Macintosh," Apple Computer, Inc., 1994, 79 pages.
Apple Quick Take 200: User's Guide for Mac OS Users, 1997, 98 pages.
"Kodak Digital Science DC210 Plus Zoom Camera: User's Guide," Kodak Website, www.kodak.com, 1998, 60 pages.
"Canon EOS A2E Instructions," Canon Inc., 1992, 80 pages.
"EOS ELAN II & ELAN II E Instructions," Canon Inc., 1995, 99 pages.
Naitou, Akira, "Image Front-Line Report: Chinon Digital Still Camera ES-3000," Photo Industry, Apr. 1996, 2 pages.
"Product Descriptions and Specifications: Kodak Professional DCS 460 Digital Camera," Eastman Kodak Company, 1994, 2 pages.
"Welcome to the Digita Desktop SDK," Digita by FlashPoint, 2000, 257 pages.
Anderson, Eric C., "Camera Hardware Reference Platform: Apple Image Capture Platform, Version 1.2" Apple Computer Inc., Jun. 25, 1996, 2 pages.
Anderson, Eric C., "Camera Hardware Reference Platform: Apple Image Capture Platform, Version 1.3" Apple Computer Inc., Jun. 25, 1996, 14 pages.
Anderson, Eric C., "Camera Hardware Reference Platform: Apple Image Capture Platform, Version 1.4" Apple Computer Inc., Jun. 25, 1996, 6 pages.
Anderson, Eric C., "Camera Hardware Reference Platform: Apple Image Capture Platform: Image Capture Head Baseline for Apple Computer, Inc.'s Image Capture Platform, Version 1.2" Apple Computer Inc., Jun. 25, 1996, 3 pages.

Schmidt, Albrecht et al., "Advanced Interaction in Context," HLJC Proc. of the First International Symposium on Handheld & Ubiquitous Computing, 1999, 13 pages.
Prasad, B. E. et al., "A Microcomputer-Based Image Database Management System," IEEE Transactions on Industrial Electronics, Feb. 1987, 44 pages.
Schilit, Bill N. et al. "Context-Aware Computing Applications," Mobile Computing Systems & Applications, Dec. 1994, 7 pages.
Foxlin, Eric et al., "An Inertia Head-Orientation Tracker with Automatic Drift Compensation for use with HMD's," Virtual Reality Software & Technology Proceedings of the VRST 1994 Conference, Aug. 23-26, 1994, pp. 158-173.
Schilit, William Noah, "A System Architecture for Context-Aware Mobile Computing," Degree Requirement for Doctor of Philosophy, Columbia University, 1995, 153 pages.
"Debut of Nikon F5," Nikon Imaging Products, from Nikon website http://imaging.nikon.com/products/imaging/technology/d-archiveslhistory-f5/index.htm, visited on Dec. 17, 2010, 9 pages.
"Best of Comdex 1996" Archive Computer Chronicles website http://www.archive.org/details/CC1417_best_of_comdex, visited on Dec. 19, 2010, 2 pages.
Wallis, Jerold W. et al., "Use of Volume-Rendered Images in Registration of Nuclear Medicine Studies," IEEE Transactions on Nuclear Science, vol. 42, No. 4, Aug. 1995, pp. 1297-1300.
"Minolta Digital Camera Dimage V Software Instruction Manual (Macintosh Version)", 1997, 30 pages.
"History of Kodak," Kodak website http://www.kodak.com/global/en/corp/historyofKodak/1990.html, visited Nov. 29, 2010, 2 pages.
Small, David et al., "Design of Spatially Aware Graspable Displays," Published in the Extended Abstracts of CHI '97, Mar. 22-27, 1997 ACM, 2 pages.
"Sony DSC-F1 PMP Format," Tempest Solutions website http://www.klingebiel.com/tempest/hd/pmp.html, visited Oct. 29, 2010, 2 pages.
"Kodak Introduces New Solutions that Let People Capture, Create and Share Digital Pictures with Ease," Apr. 14, 1997, Web Archive Kodak Digital Science Solutions Press Release, http://web.archive.org/web/19970523081822/www.kodak.com/aboutKodak/corpInfo/, visited Nov. 29, 2010, 2 pages.
Fitzmaurice, George W., "Situated Information Spaces and Spatially Aware Palmtop Computers," Communications of the ACM vol. 36, No. 7, Jul. 1993 11 pages.
"Sony Digital Still Camera Utility Software for Windows and Macintosh" Version 1.5a, 1996, 1 page.
"Custom Setting Pocket Guide," Nikon F5, 4 pages.
"QuickTime Image Capture Panel Interface Specifications for Macintosh v1.0," Apple Computer, Inc., Apr. 25, 1997, 13 pages.
Harrison, Beverly L. et al. "Squeeze Me, Hold Me, Tilt Me! An Exploration of Manipulative User Interfaces," CHI '98 Proceedings of the SIGCHI Conference on Human Factors in Computing Systems, Apr. 18, 1998, 8 pages.
Bartlett, Joel F. et al., "The Itsy Pocket Computer," WRL Research Report 2000/6, Oct. 2000, 24 pages.
"Kodak's Strategy Makes Digital Imaging Easy, Fun and Affordable for All," Web Archive Kodak Digital Science Solutions Press Release, Apr. 30, 1997 http://web.archive.org/web/19970523081904/www.kodak.com/aboutKodak/corpinfo/, visited Nov. 29, 2010, 3 pages.
Melville, John H. et al., "An Application Programmer's Interface for Digital Cameras," IS&T's 49th Annual Conference, Eastman Kodak Company, 4 pages.
Chen, Shenchang Eric, "QuickTime VR—An Image-Based Approach to Virtual Environmental Navigation," Apple Computer, Inc., ACM International Conference on Computer Graphics and Interactive Techniques, 1995, 10 pages.
"Sony DSC-F1 Digital Still Camera," Sony Brochure, Feb. 1997, 2 pages.
"Kodak Digital Science DC 120 Zoom Digital Camera Specification Sheet," Kodak, Feb. 1997, 2 pages.
"Kodak: Press Releases for New Digital Products," http://web.archive.org/web/19970524105457/www.kodak.com/daiHome/hub/pressReleases, visited Nov. 29, 2010, 2 pages.

(56) References Cited

OTHER PUBLICATIONS

"Minolta Digital Camera Dimage V Software Instruction Manual (Windows Version)", 1997, 25 pages.
"Photography—Colour Negative Films for Still Photography—Determination of ISO Speed," International Standard Organization 5800, Nov. 11, 1987, 8 pages.
"Kodak Introduces First-Ever 1.2 Million Pixel, Point-and-Shoot Digital Camera," Apr. 14, 1997, http://web.archive.org/web/19970523081829/www.kodak.com/aboutKodak/corpInfo/, visited Nov. 29, 2010, 3 pages.
"Nikon AC-2E Card for Nikon Data Link System," Nikon Packaging, 1993, 3 pages.
"Nikon F5 Instruction Manual," Photo Secretary for Nikon F5—Index Page, http://www.mir..com.my/rb/photography/hardwares/classics/NikonF5/accessories/PhotoS, visited Nov. 24, 2010, 3 pages.
Hunke, Martin et al., "Face Locating and Tracking for Human-Computer Interaction," Asilomar Conference on Signals, Systems and Computers, 1994, 5 pages.
Boyle, W. S. et al., "Charge Coupled Semiconductor Devices," Bell Systems Technical Journal, Manuscript Received Jan. 29, 1970, 9 pages.
"Apple Announces Apple Image Capture Platform," Press Release, May 13, 1996, 4 pages.
Gliedman, John, "A Monitor that Does the Twist: Whichever Way You Turn It," Computer Shopper, Nov. 1993, pp. 388-390.
"Digital Desktop Acquire Testing," 2 pages.
Ostrovsky, Olga et al., "FlashPoint Quality Assurance: Ultra265 Summary Test Report Version 1.0.0," FlashPoint, Jun. 21, 1999, 10 pages.
Ward, Joseph, "SCUltra Portable Digital Camera Engineering Specification Document Revision 0.4," Eastman Kodak Company, Apr. 27, 1999, 33 pages.
Lampmann, Michelle, "Kodak's Patents: Market Impact," InfoTrends Research Group, Inc., Mar. 2001, 7 pages.
"Digital Imaging Devices," 1 page.
"WWDC AICP Events Version 1," Apple, 2 pages.
"Confidential Nikon Proprietary Digital Camera Specs: Nikon/Apple Meeting Agenda," Nikon/Apple, Mar. 22, 1996, 5 pages.
Lee, Edgar et al., "Digita File 1.0 Alternate Application Engineering Requirements Specification Draft 0.05," FlashPoint Technology, Inc., Oct. 30, 1998, 7 pages.
"Engineering Requirements Specification Document Version X.X," FlashPoint, Jan. 17, 1999, 10 pages.
"Virtual Network Computing," At&T Laboratories Cambridge, 1999, 11 pages.
Anderson, Eric C., "Camera Hardware Reference Platform: LCD Board Version 1.1," Apple Computer, Inc., Jun. 26, 1996, 1 page.
"Apple QuickTake 100 Digital Camera for Windows: Product Introduction Plan," Apple Computer, Inc., 11 pages.
Toyoda, Kenji, "Digital Still Cameras at a Glance," Taylor & Francis Group, LLC, 2006, 19 pages.
"Kodak DC2201260 Camera Twain Acquire Module," Eastman Kodak Company, 1998, 4 pages.
"Kodak Digital Science DC120 Zoom Digital Camera Connecting the Camera to the Computer (Windows 95)," Eastman Kodak Company, Mar. 1997, 4 pages.
"Kodak Digital Science DC120 Zoom Digital Camera Windows 95 Readme," Eastman Kodak Company, Mar. 1997, 5 pages.
"Nimbus: QuickTake 150 Transition Binder," Apple, 8 pages.
"DC220/DC260 Zoom Camera Firmware Update v1.0.4," Kodak, Aug. 1998, 2 pages.
"DC120 Flash Sync Cable Instructions," Eastman Kodak Company, 3 pages.
"QuickTime Image Capture User Interface Specifications for Macintosh v1.0a1," Apple, 19 pages.
Stockwell, Joe et al., "Confidential Memorandum: FlashPoint Decision Request," Apple Corporate Development Group, Apple Imaging Group, Jul. 11, 1996, 3 pages.
Grotta, Daniel, et al. "Kodak DC-50: Point-and-Shoot Simplicity for the PC," PC Magazine, Mar. 12, 1996, 2 pages.

"About Kodak Digital Access Software (Twain Acquire)," 4 pages.
Wherry, Phil, "Casio QV-10," Photo.net Website http://photo.net/equipment/casio/, visited Oct. 29, 2010, 12 pages.
"Sony's DSC-F1—User Information FAQ," Inference Website, Jul. 25, 2003, http://www.inference.phy.cam.ac.uk/mackay/dscf1.html, visited Oct. 29, 2010, 12 pages.
Coleman, Dale, "Kodak's Digital Camera 40 Eyes Apple QuickTake Users," Reviews in MacWeek, Aug. 7, 1995, 2 pages.
"Kodak Digital Science: DC260 Zoom Camera with Picture Easy Software 3.0 Plain," Kodak Specification, 1998, 4 pages.
Mizukoshi, S, "DC265 Engineering Specification Document (Draft)", Oct. 2, 1998, 4 pages.
"Leadership in Personal Imaging—Presentations," Apple Image Capture Group, 20 pages.
"Dimage V Rotating Images Instructions," Image Panel Presentation, 25 pages.
"Photo Secretary for Nikon F5—Index Page," Mir.com Website, 2002, http://mir.com.my/rb.photography/hardwares/classics/NikonF5/accessories/PhotoS, visited Nov. 24,2010.
"Definitions," 20 pages.
Fujiwara, Y, "Kodak DC220/260 TWAIN for 32Bit Windows Release Note Version 1.2.0100.0," Kodak, Sep. 28, 1998, 9 pages.
"Kodak Digital Science: DC 120 Zoom Camera," Web Archive, http://web.archive.org/web/19970605073556/www.kodak.com/productInfo/technicalInfo/, visited Nov. 29, 2010, 3 pages.
"Kodak Digital Zoom Camera Twain Acquire Module—Plain Text," Eastman Kodak Company, 1997, 43 pages.
"Company/Model Spreadsheet," 1 page.
"Kodak Digital Science DC260 Zoom Camera Product and General Information," Eastman Kodak Company, May 1998, 12 pages.
"Kodak Digital Science DC260 Zoom Camera Product and General Information (Beta)," Eastman Kodak Company, May 1998, 9 pages.
"Kodak Digital Science DC260 Zoom Camera Product and General Information Version 1.0.1.0," Eastman Kodak Company, Aug. 1998, 12 pages.
"Kodak Digital Science DC260 Zoom Camera Product and General Information Version 1.2," Eastman Kodak Company, Nov. 1998, 12 pages.
"Kodak Digital Science DC220 Zoom Camera Product and General Information," Eastman Kodak Company, May 1998, 12 pages.
"Kodak Digital Science DC220 Zoom Camera Product and General Information (Beta)," Eastman Kodak Company, May 1998, 8 pages.
"Kodak Digital Science DC220 Zoom Camera Product and General Information Version 1.0.1.0," Eastman Kodak Company, Aug. 1998, 12 pages.
"Kodak Digital Science DC220 Zoom Camera Product and General Information Version 1.2," Eastman Kodak Company, Nov. 1998, 12 pages.
"Digital Get Directory List," Digita by FlashPoint, 2 pages.
"Welcome to the World of PC Photography: MGI PhotoSuite III SE," MGI Software Corp., 2000, 13 pages.
"Welcome to the World of PC Photography: MGI PhotoSuite 4 SE," MGI Software Corp., 2000, 11 pages.
"Eastman Kodak Company Software License Agreement Software Developer's Kit Kodak DC220/DC260-Script," Eastman Kodak Company, 2 pages.
Ward, Joe, "Requirements for DC220/DC260 Firmware Maintenance Release Version 1.01," Eastman Kodak Company, May 28, 1998, 7 pages.
Ward, Joe, "Requirements for DC220/DC260 Firmware Maintenance Release Version 1.00," Eastman Kodak Company, Jun. 14, 1998, 8 pages.
Creamer, Robert et al., "Integrated Internet Camera," U.S. Appl. No. 60/067,310, filed Dec. 4, 1997, 70 pages.
Author Unknown, "Kodak Digital Science DC50 zoom camera," User's Guide, Jan. 1996, 102 pages, Eastman Kodak Company, Rochester, New York.
Yamada, Kumi, "Sony DSC-F1," PC Watch Article (and Machine Translation), Oct. 7, 1996, 5 pages, http://pc.watch.impress.co.jp/docs/article/961007/dscf1.htm, accessed Sep. 13, 2012.

(56) References Cited

OTHER PUBLICATIONS

Author Unknown, "Released on Oct. 2010 the Two Models Sony Digital Camera," PC Watch Article (and Machine Translation), Aug. 22, 1996, 7 pages, http://pc.watch.impress.co.jp/docs/article/960822lsony.htm, accessed Sep. 13, 2012.

Yamada, Kumi, "Buy Sony Cyber-shot live-action report and DSC-F1," PC Watch Article (and Machine Translation), Oct. 25, 1996, 12 pages, http://pc.watch.impress.co.jp/docs/article/961025ldscf1.htm, accessed Sep. 13, 2012.

Author Unkown, "Digital Still Camera," Sony DSC-F1 Operating Instructions (English Version, Part No. 3-858-410-12), Sony Corporation, Copyright 1996, 60 pages.

Author Unknown, "Digital Still Camera," Sony DSC-F1 Operating Instructions (Japanese Version, Part No. 3-858-410-02), Sony Corporation, Copyright 1996, 25 pages.

Author Unknown, "New Products: Digital Color printer model and two digital still cameras, digital picture album release," Press Release (and Machine Translation), Sony Corporation, Aug. 22, 1996, 6 pages, http://www.sony.co.jp/SonyInfo/News/Press_Archive/199608/96CI-102/, accessed Sep. 13, 2012.

Olivier, James L, "Expert Report of James L. Olivier, Ph.D.," Jan. 7, 2011, submitted as part of Investigation No. 337-TA-726, United States International Trade Commission.

"Mac Nut News," Newsletter, May 1996.

Tran, Kiet, "Expert Report of Mr. Kiet Tran," Jan. 7, 2010, submitted as part of Investigation 337-TA-726, United States International Trade Commission.

Zech, Richard G., "Expert Witness Report of Richard G. Zech, Ph.D.," Jan. 7, 2011, submitted as part of Investigation No. 337-TA-726, United States International Trade Commission.

Cohen, Kevin, "Digital Still Camera Forensics," Small Scale Digital Device Forensics Journal, vol. 1, No. 1, Jun. 2007.

Severance, Charles, "Linking Computers and Consumer Electronics," IEEE Computer, Feb. 1997, pp. 119-120.

Wickelgren, Ingrid J., "The Facts About Firewire," IEE Spectrum, Apr. 1997, pp. 19-25.

"Image Orientation Sensing and Correction for Notepads," Research Disclosure No. 34788, p. 217, Mar. 1993.

"QV-10B Liquid Crystal Digital Camera Owner's Manual," Casio Computer Co. Ltd, 1995, 23 pages.

"A Monitor to Flip Over," Byte Magazine, Oct. 1991, vol. 16, No. 10, p. 42.

"MessagePad 2000 User's Manual," 1997, Apple Computer Inc., 34 pages.

U.S. Appl. No. 08/384,012.

"Digital Still Camera EI-C90," Operations Guide, 1997.

"Digital Camera RD-175," Specifications, Minolta Co., Ltd.

"Digital Camera RD-175 Software Installation Manual," 1995, Minolta Co., Ltd.

"Digital Camera RD-175 Software Instruction Manual," 2001, Minolta Co., Ltd.

"Sony Parts for Professional Products," Sony website (https://www.servicesplus.sel.sony.com/PartsPlusResults.aspx? stype=parts), accessed online Nov. 2, 2010.

"ISO 12232: Photography—Electronic still-picture cameras—Determination of ISO Speed," 1998, ISO.

"Digital Still Camera Image File Format Standard (Exif)," Version 2.1 Standard, Japan Electronic Industry Development Association, Jun. 12, 1998.

"Photography—Electronic still picture imaging—Removable memory—Part 2: Image data format—TIFF/EP," ISO Technical Committee 42 Photography, ISO/DIS 12234-2, ISO/TC 42/WG 18, Jan. 12, 1998.

"Photography—Electronic still picture imaging—Requirements for communication with digital photography devices," ISO Technical Committee 42—Photography, ISO/TC42N 4387, Working Draft #3, Jan. 28, 1999.

"Design Rule for Camera File System," JEIDA Standard, Version 1.0, English Draft, Dec. 24, 1998, Japan Electronic Industry Development Association.

"QuickTime Image Capture Application Interface Specifications for Macintosh," v. 1.0, Apple Computer, Inc.

\* cited by examiner

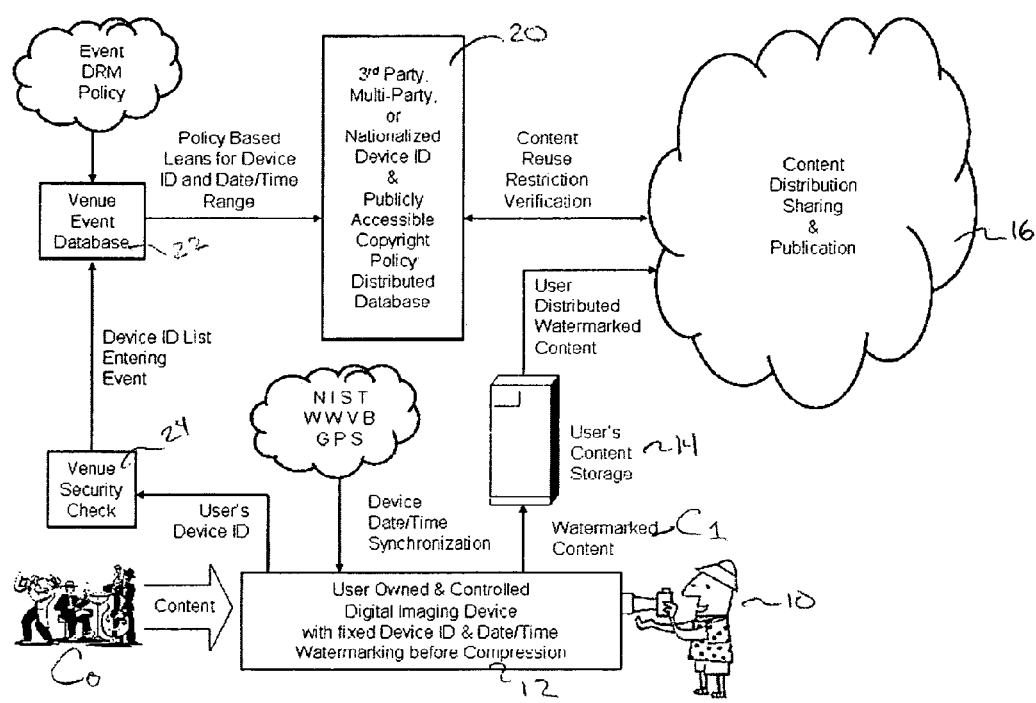
Figure 1 – System Overview for Venue Copyright.

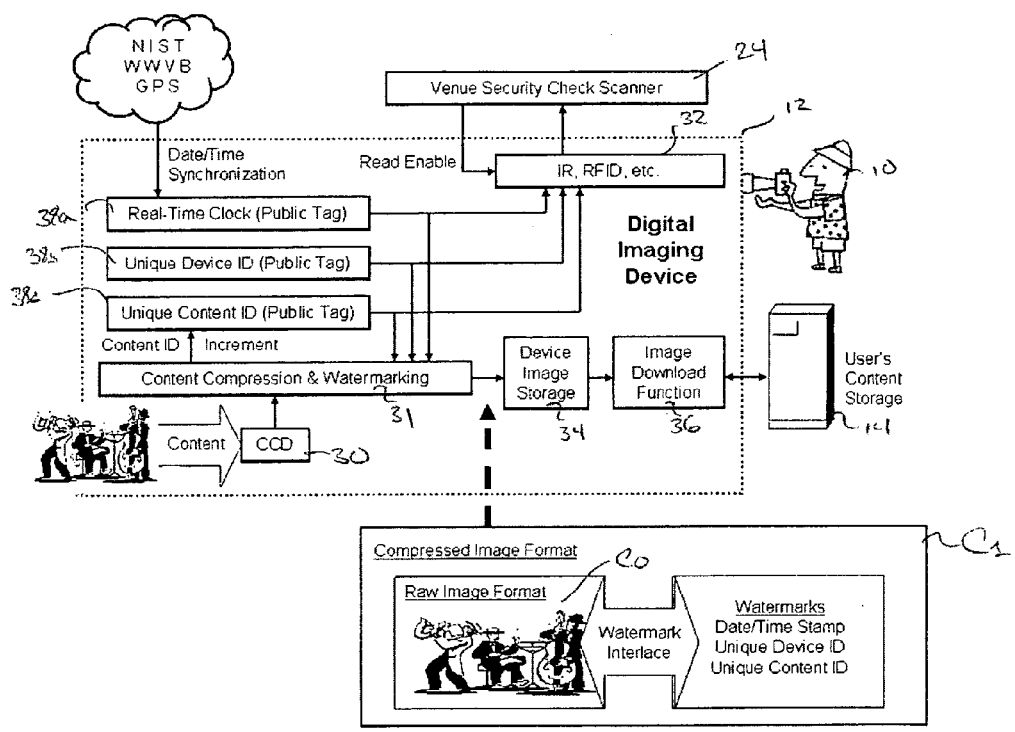
Figure 2 – Block Diagram of Digital Imaging Device with Digital Watermarking Capability.

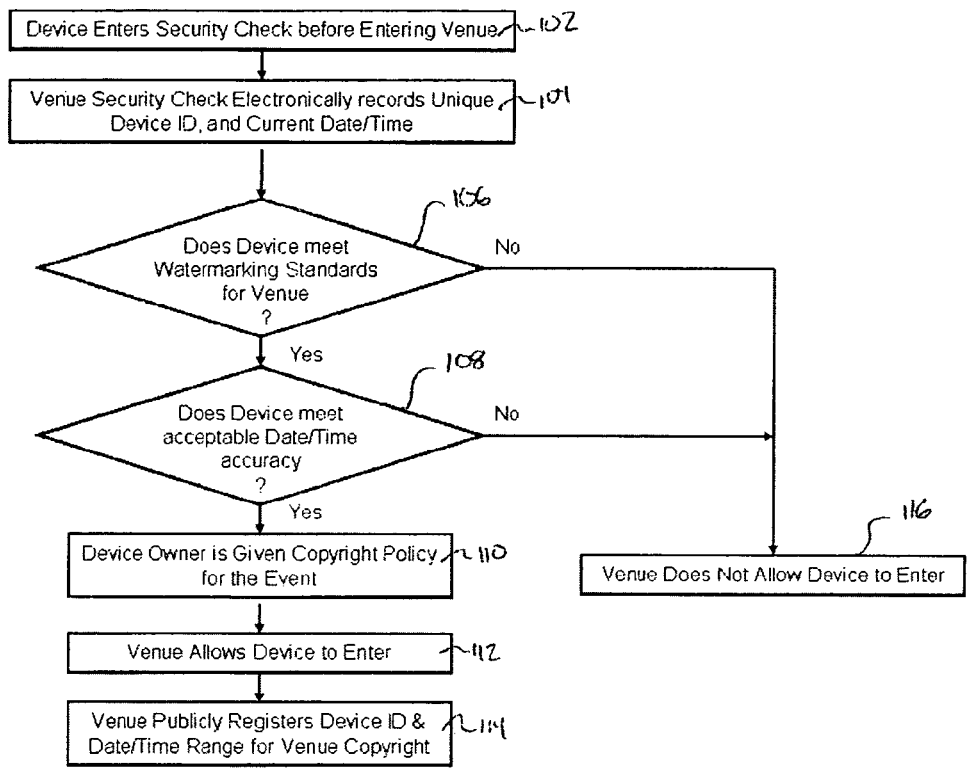
Figure 3 – Flowchart of Venue Security Check without Pre-registration.

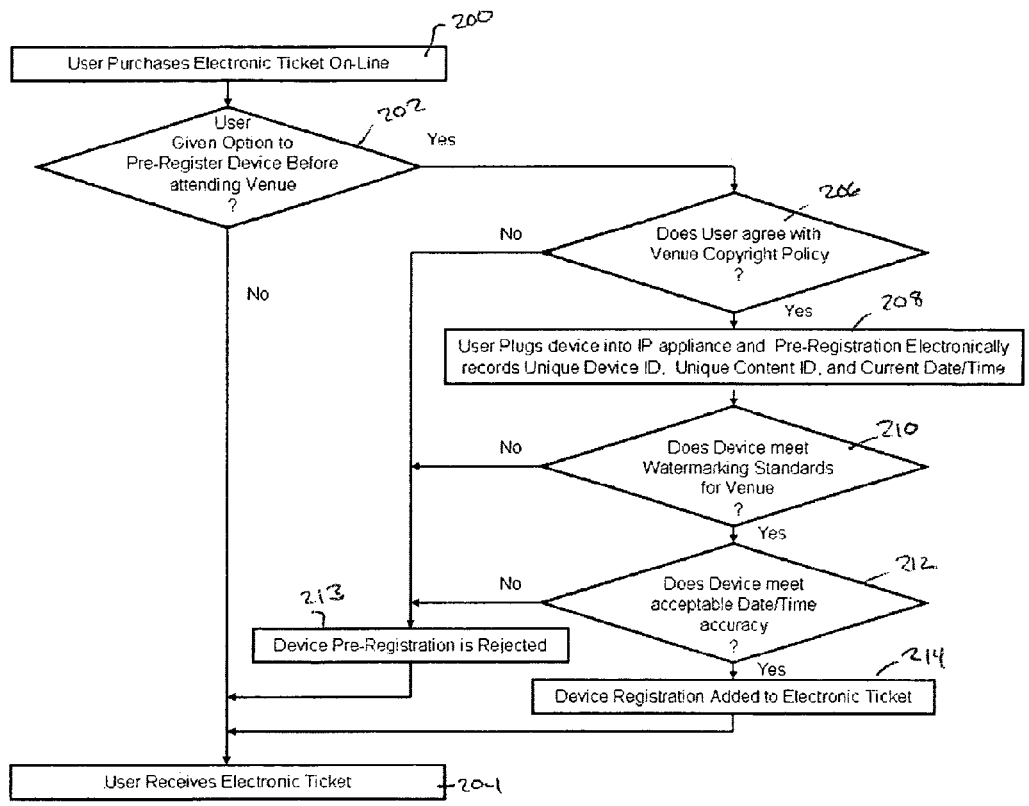
Figure 4 – Flowchart of On-line Ticket Purchase and Camera Pre-registration.

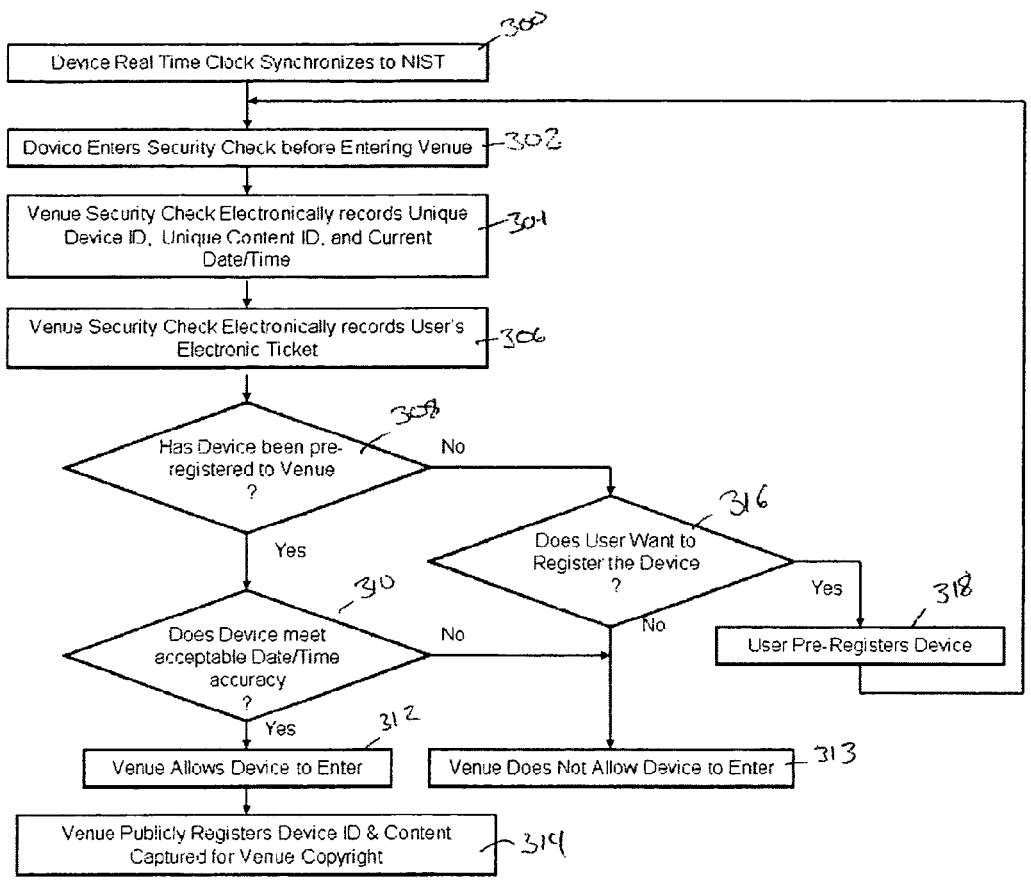
Figure 5 – Flowchart of Venue Security Check with Pre-registration.

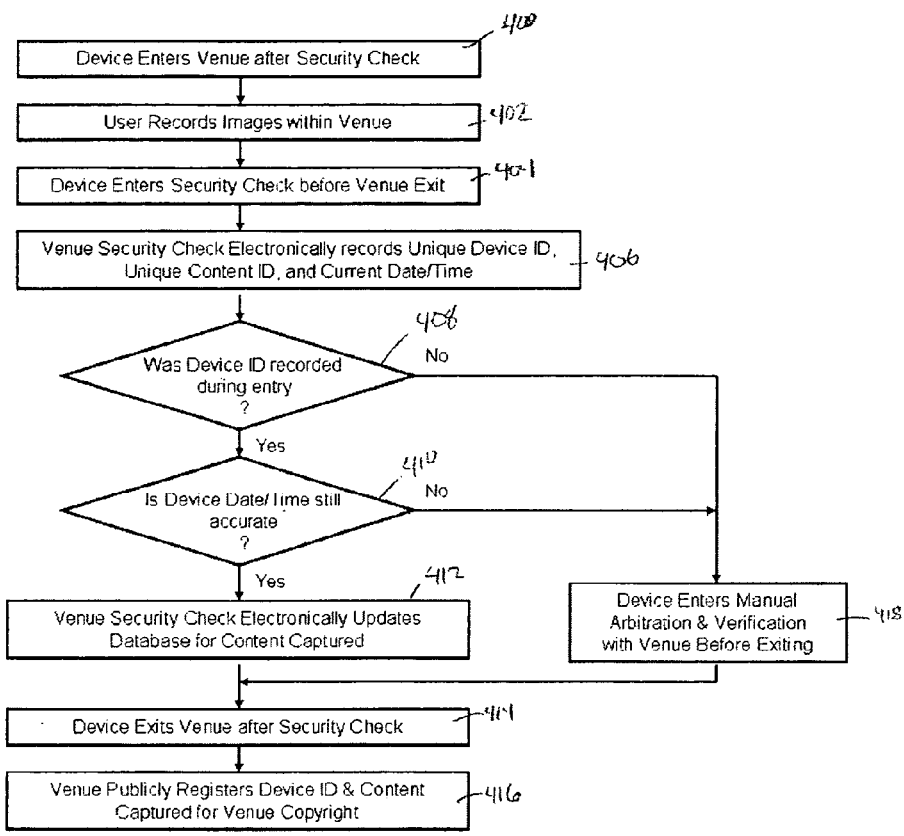
Figure 6 – Flowchart of Venue Security Check doing Post Event Recording of Content IDs.

VENUE BASED DIGITAL RIGHTS USING CAPTURE DEVICE WITH DIGITAL WATERMARKING CAPABILITY

FIELD OF THE INVENTION

Aspects of the presently disclosed technology generally pertain to the control of digital rights management (DRM) for captured digital media, including video, photo, and audio content. More particularly, features and steps are provided to enable a controlling entity such as a venue, performer, rights manager, etc. to control rights to digital media that was captured in conjunction with an event by one or more third parties, such as event attendees.

BACKGROUND OF THE INVENTION

Copyright laws protect original expressions including performances captured in audio and visual form. The proliferation of digital technology, such as computers and the internet, has introduced a myriad of challenges to rights holders, since the use of digital technology allows for exact copies of media to be made without degradation. For instance, an image obtained using a capture device such as a digital still camera or digital video camera may be copied an infinite number of times by a theoretically infinite number of persons. If any such copying is unauthorized, rights holders may have legal recourse, but may face tremendous difficulty in tracing and proving the extent of such unauthorized copying.

The proliferation of digital technology also affects rights holders with respect to live performances. For instance, the ever-increasing ubiquity of digital cameras creates a point of conflict for rights holders, such as performers or venue management authorities. Specifically, concert goers are accustomed to taking digital photographs of themselves and their surroundings using digital cameras and the like. However, in a concert setting, such cameras could be used to capture content which is owned by, e.g., the performer. Therefore, generally speaking, most venues and performers prohibit attendees at a performance from even bringing a content capture device such as a digital camera into the venue. Even if the venue or performer wished to grant the attendee a limited right to use his capture device, due to the innate nature of digital content, the venue or performer would have no guarantee that the attendees would honor any such limits.

In response to the challenges posed by the proliferation of digital content capture and management devices, various digital rights management (DRM) schemes and techniques have been developed. For example, different DRM implementations include, but are not limited to, Microsoft Windows Media DRM, Open Mobile Alliance DRM, Open MG (Sony), Fair Play (i.e. Apple iTunes), and the MPEG 21 rights expression language and rights data dictionary. These and other DRM implementations may be used to render content in a DRM-compatible format. However, rendering content in a DRM-compatible form may require additional steps and coordination that content owners may wish to avoid in certain circumstances.

Another known technique used in the field of content protection is watermarking. Watermarking comprises placing additional data in the same bits comprising content data. Various watermarking schemes have been proposed in which the watermark does not noticeably degrade the quality of the content when present. Furthermore, such watermarking schemes may be implemented in a manner that the quality of the content is severely degraded if the watermark is removed.

The use of watermarks in the context of identifying digital rights has been disclosed. For example, U.S. Patent Application Publication No. 2005/0286736 (Rhoads) includes discussion of the use of a database registry from which the identity of a rights holder for a copyrighted work may be ascertained by decoding information placed in the content by the rights holder. For instance, at a concert, audio may be identification coded before it drives concert hall speakers with the result that unauthorized recordings of the concert can be traced to a particular place and time.

It would be desirable for a venue or other rights holder to be able to implement a DRM policy or DRM policies with regard to content that is captured by third parties unaffiliated with the rights holder, such as concert attendees, without the need for the rights holder to resort to watermarking or otherwise including data in the content. Furthermore, it would be desirable to track content to a particular source in the event of a violation of DRM policies, or for other purposes.

SUMMARY OF THE INVENTION

A method of ensuring compliance with a DRM policy can comprise registering at least one capture device prior to presenting protectable content. Registering can include obtaining identification data associated with the device, such as a device ID. The method can further include storing time interval data identifying the time that the content was provided. A publicly-accessible copyright policy database may be made available, including copyright and/or rights policies for particular events, associated with time interval data and device identification identifying specific devices. The capture device or devices may be configured to embed identification data and time of capture data and all content captured by the devices. For instance, the device may include its ID number and the time that the content was captured. Registering can include verifying that the person registering the capture device agrees with a copyright policy and storing a record of such agreement. Registering can also include verifying the integrity of the device after content has been captured by the device. For example, the date and time accuracy of the device may be checked, as well as the integrity of the device's watermarking configuration. Data may be embedded into content in a variety of ways, including by watermarking the content files. If content is provided at a venue, information identifying the device may be obtained prior to allowing the device to enter the venue.

In some embodiments, the exemplary method above may further comprise a step of verifying the integrity of the device prior to allowing the device to enter the venue, including ensuring the device is capable of embedding data into content at the time of capture and ensuring that the date and time of the device are accurate within acceptable tolerances. Device identification data may be obtained during the process of providing a ticket to a venue attendee. The database may be configured to provide copyright status data, including accessing a copyright policy in response to a query identifying a device and at least a time interval. The method may include providing a DRM implementation application, the application including computer readable instructions that direct a computing device to access data embedded in content, such as by reading a watermark, the data including a unique identifier identifying the device that captured the content and capture time data that identifies when the content was captured. The DRM implementation application may further include instructions to direct a computing device to access a copyright policy database by sending a query including data identifying the device that captured the content and data indicating when the content was captured. The implementation application may then provide an indication of the copyright status of the content.

An exemplary method of ensuring the protection of digital content can include accessing data associated with at least one file that includes digital content, based upon the access data, determining the identity of the device that captured the content and when the content was captured, and querying a copyright policy database, including sending data identifying the device and the time when the content was captured.

An exemplary method of device registration in a DRM compliance system can comprise obtaining data from a capture device, the data including information uniquely identifying the device and the device's internal date and time. The device may be verified to ensure that it is compliant in accordance with DRM system requirements. Verification may include determining if the device is capable of embedding data into content at the time the content is captured and determining if the internal date and time of the device is accurate within acceptable tolerances. Registering can further include adding information identifying the device to a copyright policy database, including associating the added information with data identifying at least one time interval and at least one copyright policy. Prior to adding information identifying the device to the database, a copy of the copyright policy may be provided in human-readable form, for acknowledgement by a device user. The acknowledgement may be stored and associated with the identification information. Verifying that the device is compliant may include accessing device attributes directly or indirectly by checking a manufacturer's database.

An exemplary system for ensuring third-party compliance with DRM policies can comprise at least one capture device, with each capture device having a unique identifier and each device being capable of embedding data into content at the time of capture. The system may include at least one copyright policy database, the database associating at least one device, at least one time interval, and at least one copyright policy with one another. The system may include a rights compliance computer application, with the computer application configured to obtain data associated with digital content, the data including identification data and time data identifying a device that captured the content and the time the content was captured. The application may access the copyright policy database by providing the device identifier and time data. The devices may be configured to embed data by watermarking content, with each watermark including a unique identifier for the capturing device and the time that the content was captured.

An exemplary computer software product for use in a DRM compliance system can include instructions rendered in a computer-readable medium to direct a computing device to access data associated with at least one content file, and determine, based on the data, data identifying the device that captured the content in the file and the time at which the content was captured by the device. The instructions can further direct a computing device to query a rights management database using the identification and capture time data, and to receive copyright policy data associated with the content. Based on the copyright policy data, the application may determine the copyright status of the content.

BRIEF DESCRIPTION OF THE SEVERAL VIEWS OF THE DRAWINGS

A full and enabling disclosure, including the best mode of practicing the appended claims, directed to one of ordinary skill in the art, is set forth more particularly in the remainder of the specification, which makes reference to the appended figures, in which:

FIG. 1 illustrates an exemplary system for copyright compliance documentation;

FIG. 2 is a block diagram generally illustrating various components and functional capabilities of an exemplary digital content capture device;

FIG. 3 provides an exemplary flowchart showing steps in a venue security check scenario for situations in which a device is not pre-registered;

FIG. 4 shows an exemplary flowchart of a pre-registration process for a content capture device;

FIG. 5 provides an exemplary illustration of a venue pre-performance security check for a content capture device; and FIG. 6 provides an exemplary flowchart showing a venue security check for a content capture device that is intended to generally occur after an event.

Use of like reference numerals in different features is intended to illustrate like or analogous components.

DETAILED DESCRIPTION OF THE PREFERRED EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the instant disclosure includes modifications and variations as come within the scope of the appended claims and their equivalents The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file from a second computer, the access may involve one or more intermediary computers, proxies, and the like. The actual file may move between the computers, or one computer may provide a pointer or metafile that the second computer uses to access the actual data from a computer other than the first computer.

The various computer systems discussed herein are not limited to any particular hardware architecture or configuration. Any suitable programming, scripting, or other type of language or combinations of languages may be used to implement the teachings contained herein.

FIG. 1 illustrates an exemplary system for copyright compliance documentation. User 10 utilizes content capture device 12 to capture content $C_0$. Content $C_1$ is denoted with the subscript to indicate content in an unprotected form, as opposed to content in a protected form, which is denoted as $C_1$. Content capture device 12 may comprise any suitable device capable of capturing audio and/or visual information, such as a digital camera or digital video camera. The system requires that the content capture device be capable of embedding data into content generated using the device in a way such the data cannot be removed without severely degrading or altering the content. For example, the content capture device 12 may be configured to include a digital watermark in images captured by the device.

Any suitable watermarking technology may be used. Capture device 12 is discussed in examples herein as being a still or video camera. However, one of ordinary skill in the art will appreciate that capture device 12 may encompass any suitable device capable of fixing content in a tangible medium. The content can include visual, audio, spatial, and any other physical phenomena that may be sensed and digitally recorded.

The systems and methods disclosed herein are not dependent upon the particular hardware, software, or other implementations of capture device features, so long as the capture device: (1) is capable of watermarking or otherwise encoding data into content at the time of capture, the data including an identifier of the device and the time of capture of the content; (2) maintains data which can be used to differentiate content captured by the device; and (3) maintains data uniquely identifying the device in a manner that such identification data may be accessed. It should be appreciated that although content is described herein as being differentiated on the basis of time of capture and/or a content counter maintained by the device, other ways of uniquely identifying content may be utilized.

Referring still to FIG. 1, when the attendee enters the venue or other location from which content will be recorded, the venue records information identifying the device, such as at a security check 24, and stores the information, such as in venue event database 22. The device identification may be associated with a rights policy, such as the illustrated event DRM policy, and copyright policy records may be thereby created, each record linking one or more particular devices to a time range and a copyright policy. The records may be stored in one or more databases 20, for example a publicly accessible copyright policy distributed database. For example, one database may store records including device IDs, one or more time intervals, and a copyright policy identifier, with a second database storing copyright policies accessible by identifiers.

User 10 may store the protected content $C_1$ in any suitable storage medium, indicated as a computer at 14 (and including memory or disk space as associated with such computer), from which the user may access and share the content, generally denoted as 16. Remote or distributed storage, such as via a network server or on a portable player may be used in addition to or instead of a local PC or other computer.

Parties who have received the content may verify or otherwise obtain information about the copyright status of the content by accessing the database 20. For instance, a publication that receives an image that the publication wishes to use may access the device ID and the time of capture by decoding the watermark, and then access the copyright policy database. If the publication discovers that the distribution of the content is restricted, the publication may thereby avoid liability for copyright infringement by declining to publicize the picture. Alternatively, if a rights holder obtains a copy of content from an unauthorized source, the rights holder may have documentation of the user's agreement not to redistribute the content. If, however, the user has redistributed the content, the rights holder may be able to bring action against the user not only for copyright violations, but for breach of contract, which may, under certain circumstances, be an easier way for the rights holders to recover.

FIG. 2 is a block diagram illustrating the watermarking or other data encoding capabilities of the content capture device 12. As raw image data is captured, digital watermarks are added prior to compression, storage, and other manipulation on the device. For instance, content captured by charge-coupled device (CCD) sensors 30 is compressed and watermarked by compression and watermarking circuitry and/or routine 31. The device may maintain a number of publicly-accessible data tags, such as tags 38A, 38B, and 38C, which denote the device's real time clock, device ID, and an incremental content ID, respectively. The device may be configured to include the device ID and clock data in each image or other content file generated and stored by storage capability 34. Device 12 may further include circuits and routines to allow for compressed and watermarked images to be downloaded, such as is indicated at 36, to content storage area 14.

Watermarking may be a native feature of the capture device. However, the systems and methods disclosed herein are suitable for use with devices that are modified to include watermarking of content with a unique identifier. For instance, a camera or other device that normally captures content in a non-watermarked form may be upgraded through addition of hardware and/or software modules so that it can capture content and watermark the content at the time of capture.

As a further example, a camera or other capture device may use storage media, with the watermarking, tagging, and other capabilities being implemented at least in part by processing and logic features of the storage media. The storage media could implement the security features (watermarking, unique ID, PINs, etc) discussed in conjunction with capture device 12, which could allow for use of pre-existing capture devices including those initially provided without the presently desired comprehensive security features. In such cases, the "device ID" would be unique to the storage media, and the actual capture device would preferably be configured to interface with the storage media so as to act as a conduit to relay the storage media ID during the registration process. Alternatively, the storage media could be accessed directly during the registration process.

The digital imaging device may further include an interface 32. Interface 32 may comprise any suitable type of port, or a combination of ports. For instance, interface 32 may provide for connectivity when the device is plugged into an IP appliance or other specialized hardware. Alternatively, the interface may support a standard connection, for example, a USB or IEEE 1394 port. The interface may support wireless connectivity, for example, by connections based on IEEE Standard 802.11, Bluetooth, infrared, or other suitable connection methodology. Interface 32 may comprise an RFID tag or interface which allows access to memory on device 14 via an RFID reader.

FIG. 2 also illustrates an exemplary compressed image format where raw (unprotected) content $C_0$ is interlaced with watermarks including date and time stamp, device ID, and content ID counter to create protected image $C_1$. Other information that may be maintained by device 12 and may be included in images include data identifying the manufacturer, model number, serial number, date of manufacture, location of manufacturer, firmware revision, and date of last firmware or feature revision for the capture device.

FIG. 3 provides an exemplary flowchart showing steps in a venue security check scenario for situations in which a device is not pre-registered. At step 102, a content capture device is entered into a security check prior to entering the venue or other area at which content will be provided. At step 104, the security checkpoint electronically reads the device ID and current date and time, as well as any other additional information. This information may be accessed from the device via any suitable interface, including the wired and wireless interfaces discussed in conjunction with interface 32 of FIG. 2. At step 106, the device is verified to determine if the device is compliant with the rights protection system. For instance, the watermarking capability of the device may be evaluated, for example, by accessing a device database maintained by the device manufacturer or another group. At step 108, the internal date and time of the device are checked against an external standard to determine if the date and time are within an acceptable margin. If either the encoding of the device or the date and time are insufficient, at step 116 the device is prohibited from entering the venue. If not, at step 110, the device owner is given a copy of the copyright policy for the event. Furthermore, the registration process may include obtaining an acknowledgement from the device owner that he will comply with the copyright policy. A record of that acknowledgement may be stored and maintained along with information identifying the device. At step 112, the device is allowed to enter the venue, and at step 114, the device ID and date and time range for the copyright policy are registered in one or more databases.

FIG. 4 shows an exemplary flowchart of a pre-registration process as part of an online ticket purchase. At step 200, a user initiates the electronic online ticket purchase. However, one of ordinary skill in the art will note that the pre-registration steps are equally applicable to a separate pre-registration process. At step 202, the user is given the option to pre-register the device and if the user selects "yes", the user is presented at step 206 with the copyright policy applicable to the event. If the user agrees with the copyright policy, his agreement may be noted, and the pre-registration process obtains the device ID and current date and time at step 208. Other information, such as the present content ID count may also be obtained. Such data may be obtained directly from the capture device through use of a computing device, such as a separate IP appliance, or by interfacing the capture device and the computer through which the user is pre-registering. For instance, any technology suitable for device access via interface 32 may be used, including a wired or wireless interface, such as USB, Bluetooth, IEEE 802.11, IEEE 1344, USB, infrared, and the like. Based on data obtained from the device, at step 210, the pre-registration process determines whether the device meets encoding standards, and whether the date and time of the device is accurate at step 212. If both conditions are met, at 214 the device registration is completed, and in the ticket purchase context, the device is added to the electronic ticket. If any of the conditions are not met, the device is not pre-registered, as shown at step 213.

FIG. 5 provides an exemplary illustration of a security check at a venue. At step 302, the device enters the security check area, such as before entering the venue. At the security check, the venue or rights management personnel electronically obtain the device ID and current date and time, as well as other information, such as the content ID, as indicated at step 304. If the security check is part of the entrance process, the security check may also record the electronic ticket at step 306. At step 308, the registration status of the device is ascertained, and if the device has been pre-registered, the date and time accuracy of the device is verified at step 310. Assuming the device is accurate, it is allowed to enter at step 312, and at step 314 the device ID and content ID are recorded for inclusion in the copyright database. If the device has not been pre-registered the user is asked at step 316 if he wishes to register the device, and if so, at step 318, the pre-registration process is carried out. If the user does not wish to register the device, or if the device does not meet date and time accuracy requirements, step 313 indicates that the device is not allowed in the venue.

FIG. 6 provides an exemplary flowchart showing a venue security check after an event. At step 400, the device is entered into the venue and at step 402 records images inside the venue, and then at step 404 enters the post-performance security check. At step 406, the venue security check electronically obtains the device ID and current date and time, as well as information, such as the unique content ID, of the device. At step 408, the security check determines whether the device ID was recorded during entry, and at step 410 the security checks determines whether the date and time are still accurate within acceptable tolerances. If the device ID was not recorded and/or the time is not accurate, the device enters manual arbitration and verification at step 418, which may include a more detailed examination of the device to ensure that it has not malfunctioned or been subject to tampering. However, if the ID and time pass steps 408 and 410, the security check electronically updates the database at step 412 to indicate how much content was captured, for instance, by using the difference in content ID counts between the time of entry and time of exit. At step 414 the device exits the security check, and at step 416, the venue registers the device ID and content capture data in the copyright database.

Capture devices disclosed herein may support synchronization to a manufacturer server or other entity. For instance, if the manufacturer has implemented different, more effective, watermarking methodology, the device firmware/software could be updated to watermark content using the new methodology. The synchronization process may be achieved by an application running on a computer interfaced to the content capture device. Alternatively, the synchronization process may run on the device itself, provided that the device itself is network-capable. The device could be configured to access a remote computer over the network to supervise the device update process. For example, the device could contact an update server maintained by the manufacturer for periodic firmware updates, in a manner similar to live update services implemented for computer software and cell phone firmware updates. As part of the pre-registration, pre-performance security check, and/or post-performance security check, the device's update status could be verified, for instance, through reference to tags maintained by the device indicating the date/time of last update, and/or by consulting the manufacturer for the last time a device matching the unique ID for the device in question was updated.

Example

The following scenario is set forth for purposes of illustration and example only. In this scenario, a concert event is planned, with opening act performer $P_1$ and main act performer $P_2$ performing in succession at venue V, a large arena. Further assume that among the concert attendees are two users $U_1$ and $U_2$.

As part of the concert arrangements, $P_1$ and $P_2$ arrange for the use of venue V. As part of the arrangement, the performers contract with a Venue DRM compliance provider CP. In this scenario, the VDRM compliance provider CP maintains a distributed copyright policy server. Compliance provider CP may add two events to a venue event database, Event01 corresponding to $P_1$'s performance, and Event02 corresponding to $P_2$'s performance. CP may furthermore store the performers' respective preferred copyright policies and use restrictions and associate them with the event identifiers.

Users $U_1$ and $U_2$ may both obtain tickets to the event, either from the venue directly or via a ticketing management authority. Compliance provider CP may work with the ticketing authority to coordinate ticketing data, or may handle the ticketing. For example, during the ticketing process, assume both $U_1$ and $U_2$ indicate that they wish to bring their respective capture devices $C_1$ and $C_2$ to the concert. For this example, assume $U_1$ wishes to bring digital still camera $C_1$, while $U_2$ wishes to bring a video-capable cellular phone $C_2$. The ticketing authority's web site may direct the users to a site maintained by CP for pre-registering devices.

As part of the registration process, $U_1$ plugs his camera into an IP appliance (or directly into his PC). The pre-registration server accesses the camera's unique ID, and then consults a manufacturer's database to obtain a read-enable PIN and device-specific PIN. Using such PINs, the pre-registration server may access $C_1$ to ensure that the firmware is up-to-date and the time is within an acceptable tolerance. Assuming all is well, the $C_1$'s unique ID is provided to the ticketing authority to be included with $U_1$'s ticket. $U_1$ also reads a copyright policy presented to him in a window and clicks that he agrees not to redistribute any images taken during the concert for commercial purposes. The acknowledgement and unique ID are also stored by CP and associated with both Event01 and Event02.

Assume $U_2$ is at a public internet terminal, and thus has no access to an IP appliance or other connection for the pre-registration process to access $C_2$. Furthermore, assume that $U_2$ is indoors, and therefore cannot take advantage of $C_2$'s cellular connectivity (or assume that CP does not support pre-registration via direct connection to devices). In any event, pre-registration for $C_2$ fails, and $U_2$ obtains a "plain" ticket.

$U_1$ and $U_2$ then proceed to venue V to attend the concert. Both proceed to a checkpoint for attendees who wish to bring digital capture devices into the performance. $U_1$, who has pre-registered, provides $C_1$ for verification. Personnel of venue V or compliance provider CP access $C_1$ though, for example, $C_1$'s 802.11(b) capability, and verify that the device ID matches $U_1$'s ticket and that the device time and configuration are still in compliance. For example, if a firmware update has issued between $U_1$'s ticket purchase and his attendance at the event, he may be sent to manual arbitration and required to obtain the firmware update before entrance.

$U_2$, since he has not pre-registered, must complete the pre-registration process at venue V. Fortunately for $U_2$, the registration terminal and $C_2$ both have Bluetooth capability, and so he is able to register $C_2$. Furthermore, $C_2$ is up-to-date and within date tolerances. $U_2$ also agrees to the copyright policy, including a provision stating that videos taken during the performance may not be redistributed.

$U_1$ and $U_2$ enter the venue. CP updates stored data associated with the device IDs for $C_1$ and $C_2$ to note that $C_1$ and $C_2$ entered the venue.

Assume that $P_1$'s performance begins on time. During the performance, $U_1$ takes pictures of $P_1$, while $U_2$ videos portions of the act. Both $C_1$ and $C_2$ watermark (or otherwise encode) captured content with data indicating their respective device IDs, as well as with the time of capture.

CP notes the start and end times of the performance for Event01. At this point, CP may be able to publish a copyright policy record for Event01. The record will specify device IDs and the times of performance, plus data indicating the applicable copyright policy (such as permitted and prohibited use and other restrictions). Alternatively, for instance, the policy may specify IDs and simply Event01, with an event database accessible to provide the times and applicable policies.

Assume that there is a significant gap between $P_1$ and $P_2$'s performance, since $P_2$ was late arriving at venue V due to traffic. During the break, $U_1$ and $U_2$ take pictures and video of each other with their friends at the arena while waiting. Such pictures and video would also be watermarked. Finally, during $P_2$'s performance, both users capture stills and videos of $P_2$. CP notes the actual, not the planned, start time of $P_2$'s act for Event02. A copyright policy record is again generated, this time for Event02 and associated with device IDs and data defining Event02.

Assume, for this example, that venue V has another event planned for that evening, and so CP does not perform a post-performance security check. $U_1$ and $U_2$ go to their respective homes. $U_1$ connects $C_1$ to a PC to access the still photos from the concert. The images are downloaded to the PC, for example, under the supervision of a manufacturer-provided download application or operating system capability. $U_1$ sends a picture of $P_1$ on stage to his favorite music news website, which offers users a significant bounty for high-quality images of popular performers.

After the concert, $U_2$ takes advantage of $C_2$'s cellular connectivity by sending videos taken during the break to several friends who were unable to attend the concert. Eventually, a particularly interesting discussion amongst the friends is widely distributed across the Internet, for example, by e-mail forwarding, due to $U_2$'s expert cinematography and on-the-fly editing of the discussion.

Some time later, $P_1$'s representatives discover images of $P_1$ performing on-stage at the music news website, which promptly shuts down without providing any information as to where the image came from. However, $P_1$'s representatives are able to download a copy of the image prior to the shutdown, or afterwards from a cached copy of the site. Using a computer software application, $P_1$'s representatives decode the watermark data included in the image, which turns out to be an image captured by $U_1$ using $C_1$. $P_1$'s representatives (or other rights holder) can thus take legal action, and may use the watermarked data to establish the source of the image, and furthermore may use the record of $U_1$'s acknowledgement agreeing not to distribute the images.

In variation of the scenario, assume the music news website was more observant of potential copyright issues. Accordingly, the music news website could check the image provided by $U_1$ for use restrictions by decoding the data watermarked in the image before paying for/reproducing the image. For instance, a search for copyright policies matching the time stamp(s) and device ID associated with the image received from $U_1$ could lead the music news site to information about the copyright restrictions for the image, and the music news website could avoid liability by not accepting the image.

As for $U_2$'s popular video, an interested viewer could consult the copyright policy database to determine if any use restrictions are applicable. Since the video falls outside the timeframe of Event01 and Event02, neither $P_1$'s nor $P_2$'s restrictions apply. $U_2$ could conceivably register his own policy for protecting the content he created. Alternatively, a promoter who received the video and became interested in $U_2$'s apparent videography talent could access the database to track down $U_2$.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method of controlling content captured at a venue comprising:
   reading a device identification (ID) of a content capture device;
   determining that the content capture device has a capability to watermark content captured by the content capture device;
   reading a current date and time stored on the content capture device;
   determining that a current date and time of the content capture device are within a threshold by comparing the current date and time with a standardized date and time;
   allowing the content capture device access to the venue based on the determination that the content capture device is capable of watermarking content captured by the content capture device;
   recording the device ID based on allowing the content capture device access to the venue;
   denying the content capture device access to the venue based on the determination that the content capture device is not capable of watermarking content captured by the content capture device;
   updating a database with the device ID; and
   registering a time range at the database.

2. The method as set forth in claim 1, further comprising: verifying that a user of the content capture device agrees with a copyright policy presented to the user in a human-readable form and storing a record of such agreement.

3. The method as set forth in claim 1, further comprising a step of synchronizing the content capture device with a capture device server, wherein synchronizing includes verifying the accuracy of a clock of the device and configuration.

4. The method as set forth in claim 1, further comprising a step of verifying the integrity of the at least one capture device prior to the exit of the device from the venue, including verifying that the date and time of the device are accurate.

5. The method as set forth in claim 1, wherein the operations of reading the device ID, determining the watermarking capabilities of the content capture device, reading a current date and time stored on the content capture device, and comparing the current date and time of the content capture device with the standardized date and time to determine if the current date and time are within a threshold are performed during a process of providing a ticket to an attendee.

6. The method as set forth in claim 1, wherein the content capture device is configured to capture digital images.

7. The method as set forth in claim 1, further comprising:
   comparing the current date and time of the content capture device with the standardized date and time to determine if the current date and time are within the threshold after the content capture device has exited the venue; and
   if the current date and time are within the threshold, updating the database to indicate how much content the content capture device captured at the venue.

8. A non-transitory computer-readable storage medium storing a computer program product for controlling content captured at a venue, the computer program product including instructions that, when executed by a processor, cause the processor to perform the steps of:
   reading a device identification (ID) of a content capture device;
   determining whether the content capture device has a capability to watermark content captured by the content capture device;
   reading a current date and time stored on the content capture device;
   determining that the current date and time of the content capture device are within a threshold by comparing the current date and time with a standardized date and time;
   allowing the content capture device access to the venue based on the determination that the content capture device is capable of watermarking content captured by the content capture device;
   recording the device ID based on allowing the content capture device access to the venue;
   denying the content capture device access to the venue based on the determination that the content capture device is not capable of watermarking content captured by the content capture device;
   updating a database with the device ID; and
   registering a time range at the database.

* * * * *